(12) United States Patent
Hanakawa et al.

(10) Patent No.: US 9,259,690 B2
(45) Date of Patent: Feb. 16, 2016

(54) POLYMER SEPARATION MEMBRANE AND PROCESS FOR PRODUCING THE SAME

(75) Inventors: Masayuki Hanakawa, Otsu (JP); Shin-ichi Minegishi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 772 days.

(21) Appl. No.: 12/306,380

(22) PCT Filed: Jun. 27, 2006

(86) PCT No.: PCT/JP2006/312764
§ 371 (c)(1),
(2), (4) Date: Dec. 23, 2008

(87) PCT Pub. No.: WO2008/001426
PCT Pub. Date: Jan. 3, 2008

(65) Prior Publication Data
US 2009/0178969 A1 Jul. 16, 2009

(51) Int. Cl.
B01D 69/02 (2006.01)
B01D 69/08 (2006.01)
(Continued)

(52) U.S. Cl.
CPC ............ B01D 69/02 (2013.01); B01D 67/0006 (2013.01); B01D 69/08 (2013.01);
(Continued)

(58) Field of Classification Search
CPC .... B01D 69/08; B01D 69/082; B01D 69/125; B01D 69/12; B01D 71/28; B01D 71/32; B01D 71/36; B01D 71/08; B01D 71/12; B01D 71/16; B01D 71/18; B01D 2325/04; B01D 2325/06; B01D 2325/36; B01D 2325/38; C02F 1/44
See application file for complete search history.

(56) References Cited

U.S. PATENT DOCUMENTS 4,181,675 A * 1/1980 Makin et al. ................... 518/705
4,776,959 A * 10/1988 Kasai et al. .................... 210/490
(Continued)

FOREIGN PATENT DOCUMENTS

CN 1365849 A 8/2002
CN 1556833 A 12/2004
(Continued)

OTHER PUBLICATIONS

Chinese Office Action dated Dec. 27, 2010, application No. 200680055132.8, together with English language translation.
(Continued)

*Primary Examiner* — Katherine Zalasky
(74) *Attorney, Agent, or Firm* — RatnerPrestia

(57) ABSTRACT

The invention provides a polymer separation membrane that is excellent in separating characteristics, a permeating ability, a chemical strength (particularly chemical resistance) and a physical strength, and also excellent in a stain resistance, and a producing method therefor. The fluorinated resin-type polymer separation membrane includes a layer having a three-dimensional network structure, and a layer having a spherical structure, wherein the layer of three-dimensional network structure is formed by a fluorinated resin-type polymer composition containing a hydrophilic polymer, and the hydrophilic polymer is a substantially water-insoluble hydrophilic polymer containing at least one of a cellulose ester, an aliphatic vinyl ester, vinylpyrrolidone, ethylene oxide and propylene oxide as a polymerization component. The polymer separation membrane is applicable as a filtration membrane for water treatment, a battery separator, a charged membrane, a fuel cell membrane or a blood cleaning filtration membrane.

10 Claims, 2 Drawing Sheets

(51) Int. Cl.

| | |
|---|---|
| *B01D 69/12* | (2006.01) |
| *B01D 71/18* | (2006.01) |
| *B01D 71/12* | (2006.01) |
| *C02F 1/44* | (2006.01) |
| *B01D 67/00* | (2006.01) |
| *B01D 71/16* | (2006.01) |
| *B01D 71/32* | (2006.01) |
| *H01M 2/16* | (2006.01) |
| *H01M 8/10* | (2006.01) |

(52) U.S. Cl.
CPC ............... *B01D 69/12* (2013.01); *B01D 71/16* (2013.01); *B01D 71/32* (2013.01); *C02F 1/444* (2013.01); *H01M 2/1653* (2013.01); *H01M 8/1023* (2013.01); *H01M 8/1025* (2013.01); *H01M 8/1039* (2013.01); *H01M 8/1044* (2013.01); *H01M 8/1053* (2013.01); *B01D 2325/02* (2013.01); *B01D 2325/025* (2013.01); *B01D 2325/04* (2013.01); *B01D 2325/20* (2013.01); *B01D 2325/22* (2013.01); *Y02E 60/521* (2013.01)

(56) References Cited

U.S. PATENT DOCUMENTS

| | | | |
|---|---|---|---|
| 4,810,384 A | | 3/1989 | Fabre |
| 5,217,627 A | * | 6/1993 | Pall et al. ...................... 210/767 |
| 7,635,513 B1 | | 12/2009 | Hoshuyama et al. |
| 2003/0232184 A1 | | 12/2003 | Morikawa et al. |

FOREIGN PATENT DOCUMENTS

| | | |
|---|---|---|
| EP | 0250337 | 12/1987 |
| JP | 57-174104 | 10/1982 |
| JP | 60216804 A | 10/1985 |
| JP | 61-257203 | 11/1986 |
| JP | 02-078425 | 3/1990 |
| JP | 04-310223 | 2/1992 |
| JP | 3200095 | 2/1993 |
| JP | 5023557 A | 2/1993 |
| JP | 2003-138422 | 5/2003 |
| WO | WO 98/08595 | 3/1998 |
| WO | WO 01-28667 | 4/2001 |
| WO | WO 03/106545 | 12/2003 |

OTHER PUBLICATIONS

Japanese Office Action dated Dec. 21, 2010, application No. JP 2006-020195, together with English language translation.
Database WPI Week 198652, Thomson Scientific, London, GB; AN 1986-343157, XP002637996, & JP 61 257203 A, (Terumo Corp.) Nov. 14, 1986 *abstract*.
Supplementary European Search Report dated May 20, 2011, application No. EP06767381.
International Search Report for International Application No. PCT/JP2006/312764 dated Sep. 19, 2006.
Canadian Office Action dated Feb. 11, 2013, application No. 2,655,907.
Korean Office Action dated Jan. 24, 2013 with English translation, application No. 10-2008-7031463.
European Office Action dated Aug. 19, 2013, application No. 06 767 381.4-1356.
Canadian Office Action dated Jan. 2, 2014, application No. 2,655,907.
Canadian Office Action dated Aug. 20, 2014, corresponding to application No. 2,655,907.

\* cited by examiner

POLYMER SEPARATION MEMBRANE AND PROCESS FOR PRODUCING THE SAME

This is a U.S. National Phase Application of PCT International Application Number PCT/JP 2006/312764, filed Jun. 27, 2006 (which is incorporated herein by reference in its entirety).

Field of the Invention

The present invention relates to a polymer separation membrane, adapted for use as a filtration membrane in a field of water processing such as manufacture of drinking water, water purifying treatment or waste water treatment, and in fields of pharmaceutical manufacture, food-related industries, charged membranes, fuel cells, and blood cleaning membranes.

Background of the Invention

Polymer membranes for separation are recently utilized as filtration membranes in various fields for example in the field of water processing such as manufacture of drinking water, water purifying treatment or waste water treatment, and in food-related industries. In the water processing fields such as manufacture of drinking water, water purifying treatment or waste water treatment, a filtration with a separation membrane is being adopted for eliminating impurities in water, in place for a sand filtration process or a flocculation-sedimentation process in the prior process. Also in the food industry field, the separation membrane is employed for eliminating yeast utilized for fermentation, or for concentrating liquids.

The polymer separation membrane is being utilized in such various fields, and, in the water treatment field such as water purifying treatment or waste water treatment, a further improvement in the water permeating ability is being required as a large amount of water has to be filtered. A higher water permeating ability allows to reduce the area of membrane to be used for filtration thereby realizing a compacter filtration apparatus and reducing the facility cost, and is advantageous also for a cost of membrane replacement and an area required for installation.

Also in the water purifying treatment field, the separation membrane is required also to have a chemical resistance, since, for the purpose of sterilizing the permeated water or preventing a biofouling on the membrane surface, a sterilizer such as sodium hypochlorite may be added to the water in the membrane module or the membrane itself is washed with an acid, an alkali, chlorine or a surfactant.

Also in the field of producing city water, in order to prevent troubles, that the virulent microorganisms resistant to chlorine, such as cryptosporidium derived from excreta of animals, cannot be completely eliminated by a treatment in the water purifying plant and migrate in the treated water, and that have been found since 1990's, the separation membrane is required to have a sufficient separation characteristics that a substance to be removed from the source water does not migrate in the treated water, and a high physical strength not causing a membrane fracture or a fiber breakage even in a continued filtration process.

As described above, the separation membrane is required to be excellent in separation characteristics, a chemical strength (particularly chemical resistance), a physical strength and a permeation ability. For this reason, separation membranes formed by a polyvinylidene fluoride resin, having both the chemical strength (chemical resistance) and the physical strength, are becoming utilized in various fields.

However, the polyvinylidene fluoride resin constituting the polyvinylidene fluoride separation membrane is basically hydrophobic, and involves a drawback that the membrane surface may be contaminated by a hydrophobic interaction. Particularly, in a manufacturing process of pharmaceuticals, when such membrane is utilized for separating or purifying a physiologically active substance such as protein, such substance is adsorbed on the membrane surface to cause a denaturing thereof, thereby resulting in a decrease in the recovery rate and also in an abrupt loss in the filtration speed by pore clogging in the membrane.

In order to avoid such drawbacks, it has been conceived to improve the stain resistance by hydrophilizing the separation membrane of polyvinylidene fluoride resin, and certain hydrophilizing technologies have been proposed. For example, JP-A-57-174104 proposes a technology of introducing a polyethyleneimine polymer by a chemical reaction, thereby hydrophilizing the hydrophobic resin membrane. However, since the hydrophilic polymer thus introduced contains a charged group, such technology is rather disadvantageous for a solution containing a charged substance, particularly a protein which is an amphoteric electrolyte, or humic substances present in the surface water.

Also a hydrophilizing method of utilizing polyvinyl acetate or cellulose acetate, that is miscible with the polyvinylidene fluoride resin, is also proposed.

JP-A-61-257203 proposes preparation of a separation membrane from a resinous composition formed by blending polyvinyl acetate and polyvinylidene fluoride resin. However, a separation membrane blended with polyvinyl acetate to an extent of expressing hydrophilicity involves a drawback that the physical strength is significantly lowered by a chemical washing for example with an acid, an alkali or chlorine. Also a separation membrane, made thicker for improving the physical strength, shows a lower permeability, whereby a practically necessary permeating ability is difficult to achieve.

Therefore, for improving the hydrophilicity without increasing the content of polyvinyl acetate, Japanese Patent No. 3200095 proposes a method, in a separation membrane prepared from a blend resin of polyvinyl acetate and a polyvinylidene fluoride resin, of saponifying polyvinyl acetate to polyvinyl alcohol under an alkaline condition. A separation membrane thus prepared from a blend resin of polyvinyl alcohol and a polyvinylidene fluoride resin exhibits an excellent hydrophilicity and an excellent stain resistance to protein and the like. However, such separation membrane, when subjected to a chemical washing with an acid, an alkali or chlorine, may result in a loss of abilities thereof, as polyvinyl alcohol is easily attacked by such chemicals. Also polyvinyl alcohol, showing a strong hydrophilicity and being water-soluble, is gradually dissolved when used in the filtration of an aqueous system. Therefore, a separation membrane including polyvinyl alcohol is undesirable in the application in which the permeating water should be prevented from contamination, particularly for producing drinking water or purified water. Also it is unsuitable for treating high-temperature water such as the recovery of boiler cooling water, since the solubility of polyvinyl alcohol increases with the water temperature. Besides, a saponification process under an alkaline condition induces an alkali treatment also on the polyvinylidene fluoride resin, thereby possibly causing a coloration or a loss in the physical strength and thus deteriorating the excellent characteristics inherent to the polyvinylidene fluoride resin.

On the other hand, JP-A-2-78425 discloses preparation of a separation membrane from a blend resin of cellulose acetate and a polyvinylidene fluoride resin. However, a separation membrane blended with cellulose acetate of an amount necessary for expressing hydrophilicity may lose the physical strength when it is subjected to a chemical washing for example with an acid, an alkali or chlorine. Also a separation membrane, made thicker for improving the physical strength, shows a lower permeability, whereby a practically necessary permeating ability is difficult to achieve.

Therefore, JP-A-4-310223 discloses a method of increasing hydrophilicity of cellulose acetate thereby reducing a blended proportion thereof to the polyvinylidene fluoride resin and thus improving the physical strength. In the method of this patent reference, after a separation membrane is prepared by blending cellulose acetate to a polyvinylidene fluoride resin, the cellulose acetate in the separation membrane is saponified under a strongly alkaline condition to obtain cellulose of a high hydrophilicity. The separation membrane, constituted of a blend of thus obtained cellulose and polyvinylidene fluoride resin, shows an excellent hydrophilicity and an excellent stain resistance to proteins and the like. However, since strongly hydrophilic cellulose is uniformly distributed in such separation membrane, the entire separation membrane may be attacked by a chemical washing with an acid, an alkali or chlorine, thereby showing a loss in the physical strength. Besides, a saponification process under a strongly alkaline condition induces an alkali treatment also on the polyvinylidene fluoride resin, thereby possibly causing a coloration or a loss in the physical strength.

Also WO03/106545 pamphlet discloses a separation membrane capable of obtaining a smooth membrane surface and adequately controlling pores on the surface. Such separation membrane is a composite membrane constituted of an inner layer of an excellent physical strength, covered by a surface layer having a separating function, and provides an advantage of not losing the physical strength even by a chemical washing, since both the inner layer and the surface layer are formed by polyvinylidene fluoride resin only. Such membrane, being constituted solely of hydrophobic polyvinylidene fluoride resin, tends to adsorb humic substances or the like in the surface water, thus involving a drawback that a stable operation over a prolonged period is difficult because of an increase in the filtration resistance.

Patent Document 1: JP-A-57-174104
Patent Document 2: JP-A-61-257203
Patent Document 3: Japanese Patent No. 3200095
Patent Document 4: JP-A-2-78425
Patent Document 5: JP-A-4-310223
Patent Document 6: WO03/106545 pamphlet Summary of the Invention An aspect of the present invention is made to improve the aforementioned problems in the prior technologies, and to provide a polymer separation membrane that is excellent in separating characteristics, a permeating ability, a chemical strength (particularly chemical resistance) and a physical strength, and also excellent in a stain resistance.

The aforementioned can be accomplished by a polymer separation membrane according to an embodiment of the present invention, which is a separation polymer film based on a fluorinated resin, including a layer of a three-dimensional network structure and a layer of a spherical structure, wherein the layer of three-dimensional network structure is formed by a fluorinated resin-type polymer composition containing a hydrophilic polymer, and the hydrophilic polymer is a substantially water-insoluble hydrophilic polymer containing at least one of a cellulose ester, an aliphatic vinyl ester, vinylpyrrolidone, ethylene oxide and propylene oxide as a polymerization component.

The fluorinated resin-type polymer composition constituting the layer of three-dimensional network structure preferably contains the hydrophilic polymer in an amount of equal to or higher than 2 wt % but less than 20 wt %, with respect to the amount of the fluorinated resin-type polymer. Also the hydrophilic polymer in the fluorinated resin-type polymer composition, constituting the layer of three-dimensional network structure, is preferably a substantially water-insoluble hydrophilic polymer including a cellulose ester and/or a fatty acid vinyl ester as a polymerization component, and is further preferably at least one selected from substantially water-insoluble hydrophilic polymers containing cellulose acetate, cellulose acetate propionate, cellulose acetate butyrate and vinyl acetate as polymerization components.

Also the layer of spherical structure is preferably substantially free from the hydrophilic polymer but constituted of a fluorinated resin-type polymer. In the polymer separation membrane of the present invention, an outermost layer is preferably formed by the layer of three-dimensional network structure. Approximately spherical solid components, present in the layer of spherical structure, preferably have an average diameter of from 0.1 to 5 µm. A surface of the layer of three-dimensional network structure preferably has pores of an average pore size of from 1 nm to 1 µm.

In case of a separation member in the form of a hollow fiber, it preferably has a pure water permeability at 50 kPa and 25° C. of from 0.20 to 10 m$^3$/m$^2$·hr, a fracture strength of 6 MPa or larger, and a fracture elongation of 50% or larger. Such polymer separation membrane is particularly adapted for use as a filtration membrane for a membrane module.

A preferred method for producing the polymer separation membrane of the invention is characterized in coating, on a surface of a layer of a spherical structure constituted of a fluorinated resin-type polymer, a fluorinated resin-type polymer solution, including a substantially water-insoluble hydrophilic polymer containing at least one of a cellulose ester, a fatty acid vinyl ester, vinylpyrrolidone, ethylene oxide and propylene oxide as a polymerization component, and solidifying such coated solution in a solidifying bath thereby forming a layer of a three-dimensional network structure on the surface of the layer of spherical structure. The layer of spherical structure, constituted of the fluorinated resin-type polymer, is preferably substantially free from the hydrophilic polymer.

Another preferred method for producing the polymer separation membrane of the invention is characterized in discharging a fluorinated resin-type polymer solution containing at least a hydrophilic polymer among a cellulose ester and a substantially water-insoluble hydrophilic polymer containing at least one selected from a fatty acid vinyl ester, vinylpyrrolidone, ethylene oxide and propylene oxide, and a fluorinated resin-type polymer solution substantially free from the hydrophilic polymer simultaneously from a die and solidifying the solutions in a solidifying bath, thereby forming a laminated film constituted of a layer of three-dimensional network structure formed by the fluorinated resin-type polymer containing the hydrophilic polymer, and a layer of spherical structure formed by the fluorinated resin-type polymer.

In such producing methods, the fluorinated resin-type polymer solution, containing the hydrophilic polymer, preferably contains the hydrophilic polymer in a proportion of equal to or larger than 2 wt % but less than 20 wt % with respect to the amount of the fluorinated resin-type polymer contained in the solution. Also the hydrophilic polymer is preferably a substantially water-insoluble hydrophilic polymer, principally containing a cellulose ester and/or a fatty acid vinyl ester as the polymerization component, and is particularly preferably at least one selected from substantially water-insoluble hydrophilic polymers containing cellulose acetate, cellulose acetate propionate, cellulose acetate butyrate and vinyl acetate as polymerization component. Also the solidifying bath, to be contacted with the coated or discharged fluorinated resin-type polymer solution, containing the hydrophilic polymer, is preferably constituted of a non-solvent of a high polarity.

In the polymer separation membrane of an embodiment of the present invention, being a composite separation membrane including a layer of a spherical structure and a layer of a three-dimensional network structure and containing a specified hydrophilic polymer in the layer of three-dimensional network structure, the layer of spherical structure substantially free from the hydrophilic polymer exhibits a sufficient resistance to a chemical washing, thereby preventing a loss in the physical strength. More specifically, the physical strength of the entire membrane is borne by the spherical structure layer and is not lowered by the chemical washing, thereby preventing a fiber breakage or a membrane fracture.

On the other hand, the hydrophilic polymer in the three-dimensional network structure layer allows to suppress an adsorption of stain substances, represented by humic substances in the surface water. Also because of the presence of the spherical structure layer which bears the physical strength, the three-dimensional network structure layer may also be made thinner than in prior technologies, thereby further increasing the permeability.

Therefore the polymer separation membrane of the present invention is excellent in the separating characteristics, permeating ability, chemical strength (particularly chemical resistance) and physical strength, and is capable of improving a stain resistance without hindering these excellent properties, thus having an excellent stain resistance. Such separation membrane, when employed in water filtration, allows to extend a filtration lifetime and to reduce a water producing cost.

Detailed Description Of The Invention

The fluorinated resin-type polymer separation membrane in an embodiment of the present invention is principally characterized in including both a layer of a three-dimensional network structure and a layer of a spherical structure, wherein the layer of three-dimensional network structure is formed by a fluorinated resin-type polymer composition containing a specified hydrophilic polymer, such as a cellulose ester.

Figure 1:
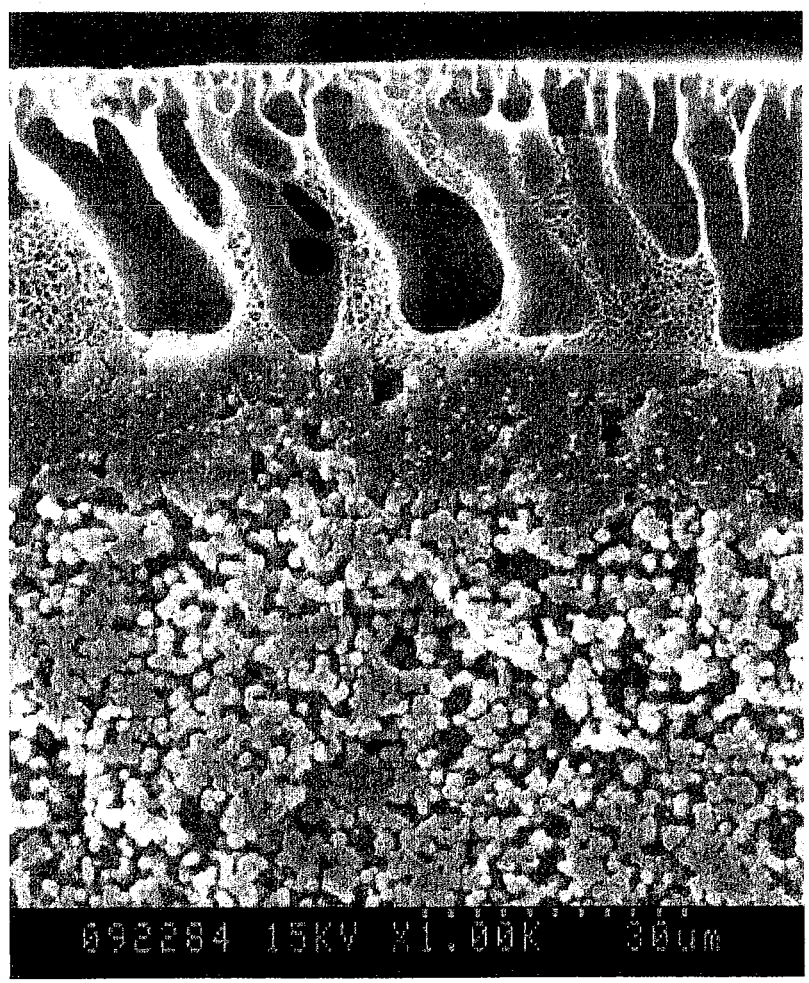
FIG. 1 shows an electron photomicrograph showing a transversal cross section of a hollow fiber membrane, prepared in Example 1.
Figure 2:
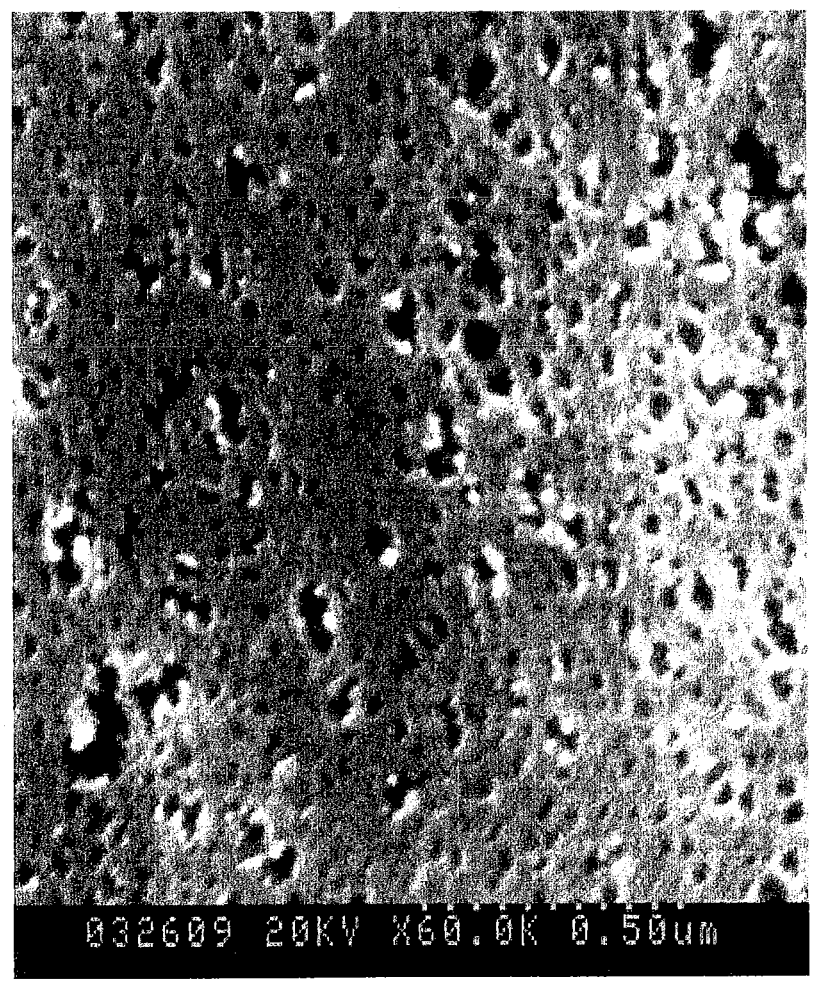
FIG. 2 shows an electron photomicrograph showing an external surface of a hollow fiber membrane, prepared in Example 1.

FIG. 1 is an electron photomicrograph (magnification 1,000×) showing a transversal cross section of a separation membrane, in which a layer of a three-dimensional network structure and a layer of a spherical structure are laminated, and FIG. 2 is an electron photomicrograph (magnification 60,000×) showing a surface of the layer of three-dimensional network structure. In FIG. 1, the layer of three-dimensional network structure is shown in an upper part, and the layer of spherical structure is shown in a lower part.

In the layer of three-dimensional network structure, as shown in a surface part (upper part) of FIG. 1 or in FIG. 2, there is distributed a structure in which resinous solid is linked and spread in a network structure three-dimensionally (such being called a three-dimensional network structure). In such three-dimensional network structure, pores (voids) defined and formed by the resinous solid constituting the network, are scattered. Such pores are represented in black color in FIG. 2.

Also in the layer of spherical structure, there is distributed a structure in which a number of resinous solids in approximately spherical shapes (including spherical shape) are linked either directly or via string-shaped solids (such structure being called a spherical structure). The layer of spherical structure means a layer in which the aforementioned spherical structure can be observed, when a cross section of the polymer separation membrane photographed by an electron microscope with a magnification of 3,000×.

In the separation membrane of a layered structure in which a spherical structure layer and a three-dimensional network structure layer are laminated, it is possible, by photographing a cross section with an electron microscope with a magnification of 3,000× and by identifying a range in which the aforementioned spherical structure is observable, as a layer of spherical structure, to identify a remaining layer as a layer of a three-dimensional network structure.

In the polymer separation membrane of an embodiment of the invention, the layered structure is not particularly restricted as long as a layer of a spherical structure and a layer of a three-dimensional network structure are present, but is preferably such that the layer of spherical structure and the layer of three-dimensional network structure are superposed. In general, in a laminar separation membrane with plural superposed layers and in the case that the layers are firmly adjoined at the interface thereof, the layers mutually intertwine at the interface thereby resulting in a denser internal structure of the membrane and lowering the permeability. On the other hand, in the case that the layers do not mutually intertwine at the interface, the permeability is not lowered but the peeling resistance at the interface is lowered. Thus the peeling resistance and the permeability at the layer interface are in a trade-off relationship, but are both required in satisfactory levels. From this standpoint, the membrane preferably has a fewer number of interfaces of or a fewer number of the spherical structure layer and the three-dimensional network structure layer, and is particularly preferably formed by a single spherical structure layer and a single three-dimensional network structure layer, namely two layers in total. It may also include a layer other than the spherical structure layer and the three-dimensional network structure layer, such as a substrate layer constituted for example of a porous substrate material. A material constituting the porous substrate is not particularly restricted and may be an organic material or an inorganic material, but organic fibers are preferable because of ease in attaining a light weight. The porous substrate is more preferably constituted of a woven or non-woven cloth formed by organic fibers such as cellulose fibers, cellulose acetate fibers, polyester fibers, polypropylene fibers or polyethylene fibers.

An arrangement of the layer of three-dimensional network structure and the layer of spherical structure (arrangement of upper and lower layers in case of a flat membrane or of inner and outer layers in case of a hollow fiber membrane) may be changed by a filtration method. In the separation membrane of an embodiment of the invention, since the layer of three-dimensional network structure bears a separating function while the layer of spherical structure bears a physical strength, the membrane is preferably so positioned that the layer of three-dimensional network structure is at the side of source water. Particularly in order to suppress a loss in the permeability by deposition of stain substances in the source water, the layer of the three-dimensional network structure is preferably provided at an outermost layer at the source water side. Thicknesses of the layer of three-dimensional network structure and the layer of spherical structure may be so suitably regulated that the separating characteristics, the permeability, the chemical strength (particularly chemical resistance), the physical strength, and the stain resistance satisfy the required conditions. A thinner three-dimensional network structure layer tends to reduce the separating characteristics and the physical strength, while a thickness layer tends to reduce the permeability. Also a thinner spherical structure layer tends to reduce the physical strength, while a thicker layer tends to reduce the permeability.

Therefore, in consideration of a balance of the above-described properties and of an operation cost at the filtering operation with the membrane, the layer of three-dimensional network structure preferably has a thickness of from 10 to 80 µm, more preferably from 20 to 60 µm and particularly preferably from 30 to 50 µm. Also the layer of spherical structure preferably has a thickness of from 100 to 500 µm, more preferably from 200 to 300 µm. Also a thickness ratio of the layer of three-dimensional network structure and the layer of spherical structure is important for the aforementioned properties and for the operation cost at the filtering operation with the membrane, and a larger proportion of the layer of three-dimensional network structure reduces the physical strength. Therefore, a ratio (A/B) of an average thickness (A) of the layer of three-dimensional network structure to an average thickness (B) of the layer of spherical structure is preferably from 0.03 to 0.25, more preferably from 0.05 to 0.15.

In the polymer separation membrane of an embodiment of the invention, a base polymer for both the layer of three-dimensional network structure and the layer of spherical structure is a fluorinated resin-type polymer, and the layer of three-dimensional network structure contains a specified hydrophilic polymer.

The hydrophilic polymer to be contained in the layer of three-dimensional network structure is a substantially water-insoluble hydrophilic polymer containing at least one selected from a cellulose ester, a fatty acid vinyl ester, vinylpyrrolidone, ethylene oxide and propylene oxide, as a polymerization component.

The fluorinated resin-type polymer is a homopolymer of vinylidene fluoride and/or a vinylidene fluoride-based copolymer. It may contain such vinylidene fluoride-based copolymers of plural kinds. Also another polymer may be employed in combination, in such a small amount as not to hinder the characteristics of the separation membrane of the invention. The vinylidene fluoride-based copolymer may be, for example, a copolymer of vinylidene fluoride and at least one selected from vinyl fluoride, tetrafluoroethyelene, hexafluoropropylene, and trifluorochloroethylene. Also a weight-average molecular weight of the fluorinated resin-type polymer may be adequately selected according to the strength and the permeability required for the polymer separation membrane. A larger weight-average molecular weight tends to reduce the permeability, while a smaller weight-average molecular weight tends to reduce the strength. Therefore, the weight-average molecular weight is preferably from 50,000 to 1,000,000. In case of a polymer separation membrane to be used in water treatment purpose and to be subjected to a chemical washing, the fluorinated resin-type polymer preferably has a weight-average molecular weight of from 100,000 to 700,000, and more preferably from 150,000 to 600,000.

Also the hydrophilic polymer to be blended in the layer of three-dimensional network structure may be a cellulose ester, a substantially water-insoluble hydrophilic polymer containing at least one selected from a fatty acid vinyl ester, vinylpyrrolidone, ethylene oxide and propylene oxide as a polymerization component, a denatured cellulose ester obtained by denaturing a cellulose ester with at least a hydrophilic molecular unit selected from a fatty acid vinyl ester, vinylpyrrolidone, ethylene oxide and propylene oxide, or a denatured cellulose ester obtained by denaturing a cellulose ester with a compound other than the hydrophilic molecular unit as long as it does not significantly hinder the hydrophilicity by the cellulose ester.

Thus, such hydrophilic polymer contains, in a main chain and/or a side chain, a hydrophilic molecular unit derived from at least one selected from a cellulose ester, a fatty acid vinyl ester, vinylpyrrolidone, ethylene oxide and propylene oxide, as a molecular unit exhibiting hydrophilicity.

The cellulose ester may be employed advantageously, as it contains three ester groups within a repeating unit and it can easily realize a satisfactory miscibility with the fluorinated resin-type polymer and a satisfactory hydrophilicity on the surface of the polymer separation membrane, by a control of level of hydrolysis of such ester groups. Examples of cellulose ester include cellulose acetate, cellulose acetate propionate and cellulose acetate butyrate. Also there may be utilized a denatured cellulose ester, formed by introducing, into such cellulose ester, a hydrophilic molecular unit such as a fatty acid vinyl ester for example by a graft polymerization.

In the case that the hydrophilic molecular unit is constituted of a hydrophilic polymer, which includes a unit derived from vinylpyrrolidone, ethylene oxide, or propylene oxide, a molecular unit other than such hydrophilic molecular unit is also included in order to obtain a substantially water-insoluble hydrophilic polymer. Examples of a monomer constituting such another molecular unit include an alkene such as ethylene or propylene, an alkine such as acetylene, vinyl halide, vinylidene halide, methyl methacrylate and methyl acrylate. Among these, ethylene, methyl methacrylate and methyl acrylate are preferred as they are available inexpensively and may be easily introduced into a main chain and/or a side chain. These may be introduced by a known polymerization technology such as radical polymerization, anionic polymerization or cationic polymerization.

The hydrophilic polymer, to be blended with the fluorinated resin-type polymer for constituting the layer of three-dimensional network structure, is preferably miscible with the fluorinated resin-type polymer under suitable conditions. It is particularly preferable, for the ease of handling, that the hydrophilic polymer and the fluorinated resin-type polymer are miscible and soluble in a good solvent for the fluorinated resin-type polymer.

As a higher content of the hydrophilic molecular unit in the hydrophilic polymer increases the hydrophilicity of the obtained polymer separation membrane and improves the permeability and the stain resistance thereof, the content is preferably made higher within an extent not detrimentally affecting the miscibility with the fluorinated resin-type polymer. The content of the hydrophilic molecular unit in the hydrophilic polymer is, though dependent also on a mixing ratio with the fluorinated resin-type polymer and on performance required for the polymer separation membrane, preferably 50 mol % or higher and more preferably 60 mol % or higher.

However, in the case that the hydrophilic molecular unit is formed by vinylpyrrolidone, ethylene oxide or propylene oxide, an excessively high content leads to a solubility in water, and the content is preferably not excessively high, for example is 50 mol % at highest. Since the polymer separation membrane according to an aspect of the invention is to be utilized in a filtration process in water, the hydrophilic polymer in the layer of three-dimensional network structure has to be substantially insoluble in water, and the hydrophilic polymer itself is insoluble in water or is rendered insoluble in water by an appropriate treatment. In case of a hydrophilic polymer including vinylpyrrolidone, ethylene oxide or propylene oxide in a main chain and/or a side chain, a water-insolubility is preferably achieved by a method of copolymerizing with another monomer. For example a random copolymer of vinylpyrrolidone and methyl methacrylate (PMMA-co-PVP) or a graft polymer of vinylpyrrolidone with polymethyl methacrylate (PMMA-g-PVP) may be formed as a water-insoluble hydrophilic polymer, by suitably selecting a copolymerization molar ratio.

On the other hand, a cellulose ester or a hydrophilic polymer containing a hydrophilic molecular unit derived from a fatty acid vinyl ester does not generally become water-soluble even with a high content of the hydrophilic molecular unit, and the content may be regulated within a wide range.

Examples of the hydrophilic polymer containing the molecular unit derived from a fatty acid vinyl ester include a homopolymer of a fatty acid vinyl ester, a copolymer of a fatty acid vinyl ester and another monomer, and a copolymer formed by graft polymerizing a fatty acid vinyl ester to another polymer. As the homopolymer of a fatty acid vinyl ester, polyvinyl acetate is preferable because it is inexpensive and easy to handle. As the copolymer of a fatty acid vinyl ester and another monomer, an ethylene-vinyl acetate copolymer is preferable because it is inexpensive and easy to handle.

A hydrolysis of a part of esters in the cellulose ester or the fatty acid vinyl ester generates hydroxyl groups that are more hydrophilic than the esters. An increased proportion of the hydroxyl group reduces a miscibility with the hydrophobic fluorinated resin-type polymer, but increases the hydrophilicity of the obtained polymer separation membrane, and improves the permeability and the stain resistance thereof. Therefore, a method of hydrolyzing a part of the cellulose ester or the fatty acid vinyl ester in the three-dimensional network structure layer within an extent of maintaining the miscibility with the fluorinated resin-type polymer is preferable for the purpose of improving the performance of the separation membrane. In case of executing an ester hydrolysis in this method, it is preferable to position the layer of three-dimensional network structure in an outermost part of the separation membrane (outermost surface to be contacted with the liquid to be processed) and to minimize the thickness of such layer, in order to avoid detrimental influence of the hydrolysis.

Also in the fluorinated resin-type polymer separation membrane of the invention, having both the three-dimensional network structure layer and the spherical structure layer, it is particularly preferable that the hydrophilic polymer contained in the three-dimensional network structure layer is a hydrophilic polymer principally constituted of a cellulose ester and/or a fatty acid vinyl ester. This is because, when the hydrophilic polymer is principally constituted of a cellulose ester and/or a fatty acid vinyl ester, the extent of hydrolysis is adjustable over a wide range even within an extent not deteriorating the miscibility with the fluorinated resin-type polymer whereby a hydrophilicity can be easily provided to the obtained polymer separation membrane. The hydrophilic polymer principally constituted of a cellulose ester and/or a fatty acid vinyl ester may be represented by a content of a cellulose ester or a fatty acid vinyl ester of equal to or larger than 70 mol %, or, in the case that a cellulose ester and a fatty acid vinyl ester are both contained, by a sum of a content of a cellulose ester and a content of a fatty acid vinyl ester of equal to or larger than 70 mol %. Such content is more preferably 80 mol % or higher.

In the polymer separation membrane of an embodiment of the invention, the layer of three-dimensional network structure or the layer of spherical structure may contain another component, such as another organic substance, an inorganic substance or a polymer, within an extent not hindering the effects of the invention.

In the polymer separation membrane of an embodiment of the invention, since the specified hydrophilic polymer is contained only in the layer of three-dimensional network structure, the interface between the layer of three-dimensional network structure and the layer of spherical structure preferably has a mutually intertwining structure of both layers, in order to improve the peeling resistance at the interface.

In a prior separation membrane in which each of the layer of spherical structure and the layer of three-dimensional network structure is formed by a fluorinated resin-type polymer only, the layer of spherical structure and the layer of three-dimensional network structure do not easily generate a peeling at the interface, because of a hydrophobic interaction between the fluorinated resin-type polymers. However, when a hydrophilic polymer different from the fluorinated resin-type polymer is contained in one of the both layers, the preventing effect for the interfacial peeling by the hydrophobic interaction between the fluorinated resin-type polymers decreases significantly, and the presence of the hydrophilic polymer not only decreases such hydrophobic interaction but also causes a hydrophobic-hydrophilic repulsion, whereby the peeling at the interface is further facilitated.

Therefore, in order to reduce such interfacial peeling, it is preferable to reduce the amount of the hydrophilic polymer in the vicinity of the interface. The amount of the hydrophilic polymer in the vicinity of the interface may be lowered, for example, by minimizing the content of the hydrophilic polymer in the layer of three-dimensional network structure. For the purpose of preventing the interfacial peeling, a ratio (a/b) of an amount (a) of the hydrophilic polymer to an amount (b) of the fluorinated resin-type polymer in the three-dimensional network structure is preferably equal to or larger than 2 wt % but less than 20 wt %, more preferably from 5 to 15 wt %. The ratio (wt %) of the amount of the hydrophilic polymer to the amount of the fluorinated resin-type polymer may be calculated, from a concentration (a1 wt %) of the hydrophilic polymer and a concentration (b1 wt %) of the fluorinated resin-type polymer in a polymer solution for forming the three-dimensional network structure layer, according to a formula $(a1/b1) \times 100$.

The ratio (a/b) of the amount of the hydrophilic polymer to the amount of the fluorinated resin-type polymer, in the layer of three-dimensional network structure, may be arbitrarily regulated and optimized so as that the separating characteristics, permeability, chemical strength (chemical resistance), physical strength and stain resistance meet the required conditions and so as to suppress the interfacial peeling. An excessively small content of the hydrophilic polymer is difficult to provide the stain resistance. On the other hand, an excessively large content of the hydrophilic polymer not only reduces the chemical strength and the physical strength, thereby facilitating the interfacial peeling, but also tends to reduce the permeability since the polymer separation membrane becomes denser.

It is also preferable to reduce the amount of the hydrophilic polymer in the vicinity of the interface, by a gradient structure in which, in the layer of three-dimensional network structure, the amount of the hydrophilic polymer gradually decreases from the surface of the polymer separation membrane toward the interface therein. For forming such gradient structure, it is preferable to employ a non-solvent of a high polarity as a liquid for solidifying the polymer solution, which is coated for forming the three-dimensional network structure, and to contact such liquid from the surface side of thus coated polymer separation membrane. In this manner, the hydrophilic polymer, having a high polarity than in the fluorinated resin-type polymer, becomes present in a larger amount at the surface side of the polymer separation membrane, whereby the amount of the hydrophilic polymer gradually decreases toward the interior of the membrane and becomes relatively smaller in the vicinity of the interface. The non-solvent of high polarity may be selected from those to be explained later, but water is particularly preferable because it has a high polarity and is inexpensive.

In the layer of spherical structure in the separation membrane, a larger average diameter of the approximately spherical solids increases a pore rate, thereby elevating the permeability, but reduces the physical strength. On the other hand, a smaller average diameter reduces a pore rate, thereby elevating the physical strength, but reduces the permeability. Therefore the average diameter is preferably from 0.1 to 5 μm, more preferably from 0.5 to 4 μm. The average diameter of the approximately spherical solids in the spherical structure layer may be determined by photographing a cross section of the polymer separation membrane with an electron microscope with a magnification of 10,000×, by measuring a diameter in 10 or more, preferably 20 or more, of arbitrarily selected approximately spherical solids, and by calculating an arithmetic mean value. The diameter of the approximately spherical solid may be obtained by determining a circle (equivalent circle) having an area same as that of the approximately spherical solid, and by utilizing the diameter of such equivalent circle.

In a separation membrane having a layer of three-dimensional network structure as the outermost layer at the side of object for separation, pores are observed by a microscopic observation of the surface of the outermost layer from directly above. Since the layer of three-dimensional network structure bears the separating function, an average pore size of the pores on the surface of the layer of three-dimensional network structure is controlled at an optimum value according the purpose of the separation membrane. A preferred average pore size on the surface of the three-dimensional network structure is variable depending on the substance to be separated, but, in order to realize a high blocking property and a high permeability at the same time, the average pore size is preferably from 1 nm to 1 μm, more preferably from 5 m to 0.5 μm. Particularly for the purpose of water treatment, the average pore size is preferably in a range of from 0.005 to 0.5 μm, and more preferably in a range of from 0.01 to 0.2 μm. An average pore size on the surface within such range enables a continuous use of the polymer separation membrane over a longer period, as the pores are not easily clogged by the stain substances in water, whereby the permeability is not easily lowered. Also even when the pores are clogged, the stain on the membrane surface may be removed by so-called countercurrent washing or air washing. The stain substances may be different by the source of water, and may include, for example in case of water from a river, a lake or a pond, inorganic substances and colloids derived from soil and mud, microorganisms and remnants thereof, and humic substances derived from plants. The countercurrent washing means a washing operation for the membrane surface, by passing a permeating water or the like in a direction opposite to that in an ordinary filtering operation. The air washing is principally employed for washing a hollow fiber membrane, and is a washing operation of shaking the hollow fiber membrane by an air supply, thereby shaking off the stain substance deposited on the membrane surface.

The average pore size on the surface of the layer of three-dimensional network structure is determined by photographing the surface of the three-dimensional network structure with an electron microscope with a magnification of 60,000×, by measuring a diameter in 10 or more, preferably 20 or more arbitrary pores, and by calculating an arithmetic mean value. In the case that the pores are not circular, the pore diameter may be obtained by determining a circle (equivalent circle) having an area same as that of the pore, and by utilizing the diameter of such equivalent circle.

The polymer separation membrane of the invention may be formed as a hollow fiber membrane or a flat membrane, but the hollow fiber membrane is practically preferable, as it may be efficiently filled into a membrane module, thereby increasing an effective membrane area per a unit volume.

The polymer separation membrane of the invention is preferably so formed as to meet a permeability, an impurity blocking property and a strength-elongation property, required in practice. As to the permeability, a pure water permeability at 50 kPa and 25° C. is preferably from 0.20 to 10 $m^3/m^2 \cdot hr$, and more preferably from 0.30 to 7 $m^3/m^2 \cdot hr$. With a pure water permeability less than 0.20 $m^3/m^2 \cdot hr$, the polymer separation membrane has an excessively low permeability and is inadequate for practical use. Also with a pure water permeability exceeding 10 $m^3/m^2 \cdot hr$, the polymer separation membrane have excessively large pore size, resulting in an undesirably low impurity blocking property.

The impurity blocking property may be represented by a blocking rate for particles of a diameter of 0.843 μm (more specifically polystyrene latex particles of an average particle size of 0.843 μm), and the blocking rate for the 0.843 μm particles is preferably 90% or higher, and more preferably 95% or higher. In case of a blocking rate less than 90%, the impurity blocking property is excessively low and is unsuitable for practical use.

Also a fracture strength is preferably 6 MPa or larger, and more preferably 7 MPa or larger. Also a fracture elongation is preferably 50% or larger, more preferably 70% or larger. A fracture strength less than 6 MPa or a fracture elongation less than 50% is undesirable, as the polymer separation membrane shows an insufficient handling property, often leading to a membrane fracture, a fiber breakage and a destruction under pressure at the filtering operation. On the other hand, since an increase in the fracture strength or the fracture elongation generally leads to a loss in the permeability, the fracture strength and the fracture elongation of the polymer separation membrane need only be maintained within a range capable of attaining the aforementioned handling property and the physical durability at the filtering operation, and may be determined in consideration of balance with the permeability and the operation cost.

By meeting the conditions of pure water permeability, impurity blocking property, fracture strength and fracture elongation, there can be obtained a polymer separation membrane having a strength and a permeability, sufficient for the applications of water treatment, a charged membrane, a fuel cell or a blood cleaning membrane.

The pure water permeability and the blocking property for 0.843 μm particles of a separation membrane, in the form of a hollow fiber, are measured by a filtration test, with a miniature membrane module containing four hollow fiber membranes of a length of 200 mm. Also in case of a flat separation membrane, these properties are measured by a filtration test utilizing a filtration apparatus, prepared by cutting the separation membrane into a disc shape of a diameter of 43 mm and setting it in a cylindrical holder (Agitation-type Ultra Holder UHP-43K, manufactured by Advantec).

Such miniature membrane module or filtration apparatus is used for executing a dead-end membrane filtration under an external pressure for 10 minutes, under conditions of a temperature of 25° C. and a filtration pressure difference of 16 kPa thereby determining a permeation amount ($m^3$). The permeation amount ($m^3$) is converted into a value per a unit time (hr) and per an effective membrane area ($m^2$), and multiplied by (50/16) times to obtain a permeation amount ($m^3/m^2 \cdot hr$) under a pressure of 50 kPa, as the pure water permeability.

Also such miniature membrane module or filtration apparatus is used for executing a dead-end membrane filtration under an external pressure for 10 minutes, under conditions of a temperature of 25° C. and a filtration pressure difference of 16 kPa, on a source water in which polystyrene latex particles of an average particle size of 0.843 μm (manufactured by Seradyn Inc.) are dispersed, and a concentration (A) of the latex particles in the source water and a concentration (B) of the latex particles in the permeation water are determined by a measurement of an ultraviolet absorption coefficient at a wavelength of 240 nm. The blocking ability is determined by $(1-A/B) \times 100$.

The pure water permeability of the separation membrane may also be obtained by converting a value, obtained by a pressurization or by a suction by a pump or the like. The water temperature at the measurement may be suitably changed according to the viscosity of the liquid to be filtered (source water).

The fracture strength and the fracture elongation of the separation membrane are not particularly restricted in the measuring method, and may be measured, for example, by measuring a strength and an elongation at a fracture by a tensile test on a sample of a length of 50 mm with a tensile speed of 50 mm/min utilizing a tensile tester, repeating the measurement for 5 times or more on different samples and calculating averages on the fracture strength and the fracture elongation.

The fluorinated resin-type polymer separation membrane of the invention, including the layer of three-dimensional network structure and the layer of spherical structure, may be produced by various methods, for example a method of forming, on a fluorinated resin-type layer of a spherical structure, a layer of three-dimensional network structure from a fluorinated resin-type polymer solution containing a specified hydrophilic polymer, or a method of simultaneously discharging, from a die, two or more fluorinated resin-type polymer solutions (one of which being a fluorinated resin-type polymer solution containing a specified hydrophilic polymer) thereby simultaneously forming the layer of three-dimensional network structure and the layer of spherical structure.

At first, a method of forming, on a fluorinated resin-type layer of a spherical structure, a layer of three-dimensional network structure from a fluorinated resin-type polymer solution containing a specified hydrophilic polymer, will be explained.

In such producing method, at first a fluorinated resin-type membrane (layer) of a spherical structure is prepared. A polymer solution is prepared by dissolving a fluorinated resin-type polymer with a relatively high concentration of from about 20 to 60 wt % in a poor or good solvent for such polymer at a relatively high temperature, and such polymer solution is discharged from a die so as to form a hollow fiber membrane or a flat membrane, and solidified under cooling in a cooling bath to cause a phase separation, thereby forming a spherical structure. A poor solvent is defined as a solvent that is incapable of dissolving the polymer by 5 wt % or more at a low temperature of 60° C. or less but is capable of dissolving the polymer by 5 wt % or more at a high temperature range of from 60° C. to the melting point of the polymer (for example, a polymer constituted solely of vinylidene fluoride homopolymer has a melting point of about 178° C.). Also a solvent capable of dissolving the polymer by 5 wt % or more in a low-temperature range of 60° C. or less is defined as a good solvent, and a solvent that does not dissolve nor swell the polymer at a temperature as high as the melting point of the polymer or the boiling point of the solvent is defined as a non-solvent.

Examples of the poor solvent for the fluorinated resin-type polymer include medium-chain alkyl ketone, ester, glycol ester and organic carbonate, such as cyclohexanone, isophorone, γ-butyrolactone, methyl isoamyl ketone, dimethyl phthalate, propylene glycol methyl ether, propylene carbonate, diacetone alcohol, or glycerol triacetate, and a mixture thereof. A mixed solvent of a non-solvent and a poor solvent is also considered as a poor solvent when the aforementioned definition for poor solvent is met. Also examples of the good solvent include lower alkyl ketone, ester and amide, such as N-methyl-2-pyrrolidone, dimethyl sulfoxide, dimethylacetamide, dimethylformamide, methyl ethyl ketone, acetone, tetrahydrofuran, tetramethylurea, or trimethyl phosphate, and a mixture thereof. Also examples of the non-solvent include an aliphatic hydrocarbon, an aromatic hydrocarbon, an aliphatic polyhydric alcohol, an aromatic polyhydric alcohol, a chlorinated hydrocarbon, and another chlorinated organic liquid, such as water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol or polyethylene glycol of a low molecular weight, and a mixture thereof.

In the producing method above, it is preferable to at first prepare the polymer solution by dissolving a fluorinated resin-type polymer at a relatively high concentration of from about 20 to 60 wt %, in a poor or good solvent for the polymer, at a relatively high temperature of from about 80 to 170° C. A higher concentration in this polymer solution provides a higher strength and a higher elongation in the polymer separation membrane, but an excessively high concentration reduces the pore rate of the polymer separation membrane, thereby deteriorating the permeability. Also in consideration of ease of handling and membrane forming property of the polymer solution, it is preferable that the viscosity of the solution is within an appropriate range. Therefore, the polymer solution more preferably has a concentration within a range of from 30 to 50 wt %.

In order to solidify, under cooling, such polymer solution in a predetermined shape such as a hollow fiber or a flat membrane, a method of discharging the polymer solution into a cooling bath is preferred. A cooling liquid to be employed in the cooling bath is preferably a liquid having a temperature of from 5 to 50° C. and containing a poor or good solvent at a concentration of from 60 to 100 wt %. The cooling liquid may contain, in addition to the poor or good solvent, a non-solvent in an extent not hindering the formation of the spherical structure. When a liquid principally constituted of a non-solvent is employed as the cooling liquid, a phase separation by the inclusion of the non-solvent proceeds preferentially to the phase separation by solidification under cooling, whereby the spherical structure becomes difficult to obtain. Also in case of preparing a polymer separation membrane by a method of solidifying, under rapid cooling, a solution, prepared by dissolving a fluorinated resin-type polymer at a relatively high concentration in a poor or good solvent for the polymer and at a relatively high temperature, the separation membrane may assume a dense network structure instead of a spherical structure, depending on conditions. Therefore, in order to form a spherical structure, a combination of a concentration and a temperature of the polymer solution, a composition of the solvent to be employed, and a composition and a temperature of the cooling liquid, is controlled appropriately.

In case of forming the polymer separation membrane into a hollow fiber membrane, such hollow fiber may be obtained by discharging the prepared polymer solution, from an outer tube of a double-tube nozzle, and discharging a fluid for forming a hollow part from an inner tube of the double-tube nozzle, and executing a solidification under cooling in the cooling bath. The hollow part forming fluid may be a gas or a liquid, but, in the invention, is preferably a liquid containing a poor or good solvent with a concentration of from 60 to 100 wt % as in the cooling liquid. The hollow part forming fluid may be supplied under cooling, but may also be supplied without cooling when the hollow fiber membrane can be sufficiently solidified by the cooling power of the cooling bath only.

Also in case of forming the polymer separation membrane into a flat membrane, the prepared polymer solution is discharged from a slit piece and solidified in a cooling bath, thereby obtaining a flat membrane.

On thus prepared fluorinated resin-type membrane (layer) having spherical structure, a three-dimensional network structure is formed (laminated) from a fluorinated resin-type polymer solution, containing a specified hydrophilic polymer. The laminating method is not particularly restricted, but is executed in the following manner. On the fluorinated resin-type membrane (layer) having spherical structure, a fluorinated resin-type polymer solution, containing a specified hydrophilic polymer, is coated and is then immersed in a solidifying bath to form a laminated layer having a three-dimensional network structure.

The fluorinated resin-type polymer solution containing the specified hydrophilic polymer, for forming the three-dimensional network structure, is constituted of a specified hydrophilic polymer, a fluorinated resin-type polymer and a solvent as described above, and the solvent is preferably a good solvent for the fluorinated resin-type polymer. The good solvent for the fluorinated resin-type polymer may be the good solvent described above. The fluorinated resin-type polymer solution containing the hydrophilic polymer preferably has a polymer concentration within a range of from 5 to 30 wt %, and more preferably from 10 to 25 wt %. A concentration less than 5 wt % tends to reduce the physical strength of the three-dimensional network structure layer, while a concentration exceeding 30 wt % tends to reduce the permeability.

Also in the fluorinated resin-type polymer solution containing the hydrophilic polymer, an optimum dissolution temperatures varies depending on a type and a concentration of the fluorinated resin-type polymer and the hydrophilic polymer, a type of the solvent, and a type and a concentration of an additive to be explained later. In order to reproducibly prepare a stable fluorinated resin-type polymer solution, the preparation is preferably executed by heating for several hours at a temperature not exceeding the boiling point of the solvent under agitation, thereby obtaining a transparent solution. Also a temperature at the coating of the fluorinated resin-type polymer solution is important for obtaining a polymer separation membrane of excellent characteristics. For stably producing the polymer separation membrane, it is preferable to control the temperature so as not to deteriorate the stability of the fluorinated resin-type polymer solution, and to avoid an entry of a non-solvent from the exterior of the system. An excessively high temperature of the fluorinated resin-type polymer solution at the coating operation causes a dissolution of the fluorinated resin-type polymer in a surfacial part of the layer of spherical structure, thereby promoting formation of a dense layer at the interface of the layer of three-dimensional network structure and the layer of spherical structure, and thus reducing the permeability of the obtained separation membrane. On the other hand, an excessively low solution temperature at the coating operation causes a partial gelation of the solution in the course of coating operation, thereby leading to a separation membrane containing many defects and deteriorating the separating ability. Therefore, the solution temperature at the coating operation has to be selected optimally according to the composition of solution and the desired separating performance.

In case of producing a polymer separation membrane of a hollow fiber shape, the fluorinated resin-type polymer solution containing the specified hydrophilic polymer may be coated on an external surface of the fluorinated resin-type hollow fiber membrane (layer) of spherical structure, preferably by a method of immersing the hollow fiber membrane in a polymer solution, or by a method of dripping a polymer solution onto the surface of the hollow fiber membrane. Also the fluorinated resin-type polymer solution containing the specified hydrophilic polymer may be coated on an internal surface of the hollow fiber membrane, preferably by a method of injecting a polymer solution into the hollow fiber membrane. In such methods, the coating amount of the polymer solution may be controlled, for example, by a method of controlling a supply amount of the polymer solution to the coating operation, or a method, after immersing the polymer separation membrane in the polymer solution or after coating the polymer solution on the polymer separation membrane, of scraping off or blowing off, with an air knife, a part of the deposited polymer solution.

The solidifying bath to be used for immersion after the coating preferably contains a non-solvent for the fluorinated resin-type polymer. For such non-solvent, the aforementioned non-solvents may be employed advantageously. A contact of the coated resin solution with a non-solvent causes a phase separation induced by the non-solvent, thereby forming a layer of three-dimensional network structure. In the process of the invention, in which the fluorinated resin-type polymer solution, containing the specified hydrophilic polymer, is coated and then immersed in the solidifying bath, a non-solvent having a high polarity, such as water, is preferably utilized as the solidifying bath.

A method of controlling the average pore size on the surface of the three-dimensional network structure layer within a desired range (form example of from 1 nm to 1 μm) is variable depending on a type and a concentration of the hydrophilic polymer to be contained in the fluorinated resin-type polymer solution, but may executed, for example, in the following manner.

An additive for controlling pore size, which is blended in the fluorinated resin-type polymer solution containing the specified hydrophilic polymer, is dissolved out at or after the formation of the three-dimensional network structure, thereby controlling the average pore size on the surface.

Examples of such pore size controlling additive include following organic and inorganic compounds. The organic compound to be employed is preferably soluble both in the solvent to be employed in the fluorinated resin-type polymer solution and in the non-solvent that causes the non-solvent-induced phase separation, and examples include a water-soluble polymer such as polyvinylpyrrolidone, polyethylene glycol, polyethylenimine, polyacrylic acid, or dextran, a surfactant, glycerin or a saccharide. The inorganic compound to be employed is preferably soluble both in the solvent to be employed in the fluorinated resin-type polymer solution and in the non-solvent that causes the non-solvent-induced phase separation, and examples include calcium chloride, magnesium chloride, lithium chloride and barium sulfate. It is also possible, without utilizing such additive, to control a phase separation speed by a type and a concentration of the non-solvent in the solidifying bath and by a temperature, thereby controlling the average pore size on the surface. In general, a higher or lower speed of phase separation respectively decreases or increases the average pore size on the surface. Also the speed of phase separation may be controlled by adding a non-solvent to the polymer solution.

Now, as another method of producing the fluorinated resin-type polymer separation membrane of the invention, including the layer of three-dimensional network structure and the layer of spherical structure, there will be explained a method of simultaneously discharging two or more resin solutions (one of which being a fluorinated resin-type polymer solution containing a specified hydrophilic polymer), from a die thereby forming a layer of three-dimensional network structure and a layer of spherical structure at the same time.

Such producing method may be executed, for example, by a process of discharging a fluorinated resin-type polymer solution for forming a three-dimensional network structure and a fluorinated resin-type polymer solution for forming a spherical structure simultaneously in a laminated state from an aperture and solidifying the solutions in a cooling bath containing a non-solvent, thereby obtaining a separation membrane in which both layers are superposed. Such process allows to simultaneously form the layer of three-dimensional network structure and the layer of spherical structure, thereby simplifying the manufacturing process.

The fluorinated resin-type polymer solution for forming the three-dimensional network structure contains the aforementioned specified hydrophilic polymer, and, after the emission, the part of such polymer solution undergoes a phase separation induced by the non-solvent in the cooling bath, thereby forming a three-dimensional network structure. Stated differently, a solution dissolving a fluorinated resin-type polymer in a solvent and containing a specified hydrophilic polymer causes, upon contacting the solidifying bath, a phase separation induced by the non-solvent, whereby a three-dimensional network structure is formed. In the fluorinated resin-type polymer solution for forming three-dimensional network structure, the hydrophilic polymer is contained preferably in an amount equal to or larger than 2 wt % but less than 20 wt % of the amount of the fluorinated resin-type polymer, in consideration of the characteristics of the obtained polymer separation membrane.

Also the fluorinated resin-type polymer solution for forming the spherical structure is capable of forming a spherical structure, by a solidification under cooling in a cooling bath, after the emission. Such polymer solution may be formed, for example, by dissolving a fluorinated resin-type polymer with a relatively high concentration of from about 20 to 60 wt % in a poor or good solvent for the fluorinated resin-type polymer, at a relatively high temperature (from about 80 to 170° C.).

The fluorinated resin-type polymer, the hydrophilic polymer, the solidifying bath, the poor solvent and the good solvent to be employed may be those described above.

A die, to be used in case of simultaneously discharging the fluorinated resin-type polymer solution for forming the three-dimensional network structure and the fluorinated resin-type polymer solution for forming the spherical structure, is not particularly restricted, and, in case of forming a flat polymer separation membrane, a die of double-slit type, having two parallel slits, is employed advantageously.

Also in case of forming a polymer separation membrane of a hollow fiber shape, a die of concentric triple tube type is employed advantageously. A hollow fiber membrane is formed by discharging the fluorinated resin-type polymer solution for forming three-dimensional network structure from an outer tube of the triple-tube die, the fluorinated resin-type polymer solution for forming spherical structure from a middle tube of the triple-tube die, and the fluid for forming a hollow part from an inner tube of the triple-tube die, and solidifying the solutions under cooling in a cooling bath. Preparation of the hollow fiber membrane in such process is particularly preferable, since the amount of the fluid for forming the hollow part may be made smaller than the amount of the solidifying liquid in case of producing a flat membrane. A hollow fiber membrane, having an outer layer of three-dimensional network structure and an inner layer of spherical structure, is obtained by discharging the fluorinated resin-type polymer solution for forming three-dimensional network structure from the outer tube, and the fluorinated resin-type polymer solution for forming spherical structure from the middle tube. On the other hand, a hollow fiber membrane, having an inner layer of three-dimensional network structure and an outer layer of spherical structure, is obtained by discharging the fluorinated resin-type polymer solution for forming three-dimensional network structure from the middle tube, and the fluorinated resin-type polymer solution for forming spherical structure from the outer tube.

The polymer separation membrane of the invention is accommodated in a casing provided with a source liquid entrance and a permeation liquid exit as a membrane module, and is utilized in a membrane filtration treatment. In the case of utilizing the polymer separation membrane of a hollow fiber form, there may be employed, for example, a module structure of a type in which a bundle of plural hollow fiber membranes are accommodated in a cylindrical container and the hollow fiber membranes fixed at both ends or either end with a resinous material such as polyurethane or epoxy resin for collecting the liquid permeated by the hollow fiber membranes, or a type in which hollow fiber membranes are fixed at both ends in a flat plate shape for collecting the liquid permeated by the hollow fiber membranes.

Also in the case of utilizing the polymer separation membrane of a flat membrane form, there may be employed, for example, a module structure in which a flat membrane is folded in a envelope-like structure and wound spirally about a liquid collecting tube and is accommodated in a cylindrical container for collecting the liquid permeated by the membrane, or a module structure in which flat membranes are positioned on both sides of a liquid collecting plate and are tightly sealed, in peripheral parts thereof, to the plate whereby the liquid permeated by the membranes is collected.

Such membrane module is utilized as an apparatus for a water preparation or a fluid filtration, by providing the source liquid side with pressurizing means or the permeation liquid side with suction means, whereby a fluid (particularly water) can permeate through the membrane. The pressurizing means may be a pump, or a pressure by a water head. Also the suction means may be a pump or a siphon.

A membrane separation apparatus, using the separation membrane for filtration, may be utilized, in the field of water treatment, for a water purifying treatment, a city water treatment, a waste water treatment or a industrial water preparation, and the water to be treated includes river water, lake water, underground water, seawater, sewage water and waste water.

The polymer separation membrane according to an embodiment of the present invention may be utilized as a battery separator for separating an anode and a cathode in a battery. In such case, the membrane is anticipated to provide effects such as an improvement in the battery performance because of a high ionic permeability and an improvement in the battery durability because of a high fracture strength.

Furthermore, the polymer separation membrane produced by the producing method of the invention, when prepared as a charged membrane by introducing a charge group (ion-exchange group), is anticipated to provide an improving effect for ion discriminating property and an improving effect for the durability of the charge membrane because of a high fracture strength.

Furthermore, the polymer separation membrane according to an embodiment of the invention, when impregnated with an ion-exchange resin and employed as an ion-exchange membrane in a fuel cell, is anticipated to improve the performance of the fuel cell, particularly in case of employing methanol as a fuel, since the ion-exchange membrane can be suppressed from a swelling by methanol. It is also anticipated to provide an improvement in the durability of the fuel cell, because of a high fracture strength.

Furthermore, the polymer separation membrane according to an embodiment of the invention, when employed as a blood cleaning membrane, is anticipated to provide an improved ability for removing waste substances in the blood and an improved durability of the blood cleaning membrane, because of a high fracture strength.

EXAMPLES

Now the present invention will be clarified further by examples, but the present invention is not limited to such examples.

Following values representing the membrane structure and membrane performance were measured in the following manner.

Average Diameter of Approximately Spherical Solids in the Layer of Spherical Structure of Separation Membrane:

A cross section of a polymer separation membrane is photographed with a magnification of 10,000× by a scanning electron microscope (S-800, manufactured by Hitachi Ltd.), and an average diameter is obtained by measuring diameters of 30 approximately spherical solids in the spherical structure layer, selected arbitrarily on the photograph and arithmetically averaging the measured diameters.

Average Pore Diameter on the Surface of the Layer of Three-dimensional Network Structure of Separation Membrane:

A surfacial area of a polymer separation membrane is photographed with a magnification of 60,000× by the scanning electron microscope above, and an average diameter is obtained by measuring pore diameters of 30 pores on the surface of the three-dimensional network structure layer, selected arbitrarily on the photograph and arithmetically averaging the measured diameters.

Average Thickness of Three-dimensional Network Structure Layer and Average Thickness of Spherical Structure Layer of Separation Membrane:

A cross section of a polymer separation membrane is photographed with magnifications of 100× and 1,000× by the scanning electron microscope above, and a thickness of each layer is calculated from the photographs by the following methods.

In case of a separation membrane of a layered structure, having an outer layer of three-dimensional network structure and an inner layer of spherical structure, an average thickness of the layer of three-dimensional network structure is measured in the following method.

On the photomicrograph of 1,000×, a distance is measured, from an arbitrary point on the surface of the outer layer, to a point where a spherical structure is observed at first, along a direction toward the inner layer and perpendicular to a tangential line to the surface of the outer layer. Such distance defines a thickness of the three-dimensional network structure layer. An average thickness of the three-dimensional network structure layer is calculated by repeating this operation in arbitrary 30 points, and arithmetically averaging the distances.

An average thickness of the spherical structure layer may also be calculated in a similar manner. However, in following examples, the separation membrane has a thick spherical structure layer and the entire membrane from the surface of the outer layer to the surface of the inner layer at the opposite side cannot be covered by a single photomicrograph of 1,000×, so that the measurement has to be made by pasting plural photographs. In the following examples, a photomicrograph of 100 times is used for measuring a distance from the surface of the outer layer to the surface of the inner layer at the opposite side on the cross section of the polymer separation membrane, as an entire thickness of the separation membrane, and an average thickness of the entire separation membrane is obtained by repeating this operation on arbitrary 30 points, and averaging the thicknesses. Then the thickness of the spherical structure layer is obtained by subtracting the average thickness of the three-dimensional network structure layer from the average thickness of the entire polymer separation membrane.

Pure Water Permeability of Separation Membrane:

In case of a polymer separation membrane of a hollow fiber form, a miniature membrane module is prepared with four hollow fiber membranes of a length of 200 mm. Also in case of a polymer separation membrane of a flat membrane form, it is cut into a circular shape with a diameter of 43 mm and is set in a cylindrical filter holder to form a filtration apparatus. Utilizing pure water obtained by reverse osmosis as the source water, a dead-end membrane filtration under an external pressure is conducted for 10 minutes, under conditions of a temperature of 25° C. and a filtration pressure difference of 16 kPa thereby determining a permeation amount ($m^3$). The permeation amount ($m^3$) is converted into a value per a unit time (hr) and per an effective membrane area ($m^2$), and multiplied by (50/16) times to obtain a permeation amount ($m^3/m^2 \cdot hr$) under a pressure of 50 kPa, as the pure water permeability.

Latex Particle Blocking Ability of Separation Membrane:

A miniature membrane module for a polymer separation membrane of hollow fiber form, or a filtration apparatus for a flat membrane, is prepared in the similar manner as described above. A dead-end membrane filtration under an external pressure is executed for 10 minutes, under conditions of a temperature of 25° C. and a filtration pressure difference of 16 kPa, on a source water in which polystyrene latex particles of an average particle size of 0.843 μm (manufactured by Seradyn Inc.) are dispersed, and a concentration (A) of the latex particles in the source water and a concentration (B) of the latex particles in the permeation water are determined by a measurement of an ultraviolet absorption coefficient at a wavelength of 240 nm. The blocking ability (%) is determined by (1−A/B)×100. The ultraviolet absorption coefficient at 240 nm is measured by a spectrophotometer (U-3200, manufactured by Hitachi Ltd.).

Fracture Strength and Fraction Elongation of Separation Membrane:

A specimen of a measurement length of 50 mm is subjected to a tensile test with a tensile tester (TENSILON®-100, manufactured by Toyo-Baldwin Co.) at a tensile speed of 50 mm/min to determine a strength and an elongation at fracture. Measurement is repeated 5 times on different specimens, and an average fracture strength and an average fracture elongation are determined. In case of a flat membrane, the specimen has a width of 5 mm.

Evaluation of Air Scrubbing Resistance of Separation Membrane:

An air scrubbing durability test was executed in order to evaluate the physical durability of the separation membrane.

A bundle of 1,500 hollow fiber membranes is filled in a cylindrical transparent container of a diameter of 10 cm and a length of 100 cm to form a membrane module. Then the membrane module is filled with drinking water, and the membrane surface is subjected to an air scrubbing by a continuous air supply from a lower part of the container, at a rate of 100 L/min. The air scrubbing is conducted continuously for 122 days, and then the fibers are inspected for fracture during such 122 days. The period of 122 days corresponds to an air scrubbing for 10 years, in a practical operational condition of executing an air scrubbing for 1 minutes in every 30 minutes.

Evaluation of Filtering Operation Property of Separation Membrane:

An evaluation of operation property was conducted on the hollow fiber membranes, that were not fractured in the test for air scrubbing durability.

A hollow fiber membrane module with a diameter of 3 cm, a length of 50 cm and an effective membrane area of 0.3 m² was prepared, and used for an external pressure dead-end filtration with a constant flow rate, utilizing water of Lake Biwa as the source water. The filtering operation was conducted by pressurizing the source water with a pump at the source side. The linear speed of filtration was selected as 3 m/d. At an interval of every 120 minutes, the membrane surface was washed by a back washing for 30 seconds with a 5 ppm aqueous solution of sodium hypochlorite, followed by an air scrubbing with air for 1 minute. The filtering operation was executed continuously for 1 month from Oct. 5, 2004 to Nov. 5, and a filtration pressure difference (A) immediately after the physical washing at the start of filtering operation, and a filtration pressure difference (B) at the end of filtering operation were measured. A lower filtration pressure difference (A) at the start of filtering operation means that the operation can be initiated with a lower energy. Also an increase (%) in the filtration pressure difference was calculated by a formula (B−A)×(1/A)×100. A lower increase in the filtration pressure difference enables a stabler operation, namely a better operation property. Therefore a membrane having both a lower filtration pressure difference (A) at the start of filtering operation and a lower increase in the filtration pressure difference enables a stabler operation with a lower energy. The filtration time (120 minutes) above is selected longer the practically anticipated filtration time (30 minutes), in order to evaluate the operation property within a short period.

Example 1

A vinylidene fluoride homopolymer having a weight-average molecular weight of 417,000 and γ-butyrolactone were dissolved, in a proportion of 38 wt % and 62 wt % respectively, at 170° C. The obtained polymer solution was discharged from a die, accompanied by γ-butyrolactone as a hollow part forming liquid, and solidified in a cooling bath formed by a 80 wt % aqueous solution of γ-butyrolactone of 20° C. to obtain a hollow fiber membrane constituted of a spherical structure.

Then a vinylidene fluoride homopolymer having a weight-average molecular weight of 284,000 by 14 wt %, cellulose acetate (cellulose triacetate CA435-75S, manufactured by Eastman Chemical Co.) by 1 wt %, N-methyl-2-pyrrolidone by 77 wt %, polyoxyethylene palm oil fatty acid sorbitan (Ionet T-20C, hereinafter represented as T-20C, manufactured by Sanyo Chemical Industries, Ltd.) by 5 wt % and water by 3 wt % were mixed and dissolved at 95° C. to obtain a polymer solution. This membrane forming liquid was uniformly coated on the surface of the hollow fiber membrane of spherical structure, and was immediately solidified in a water bath to obtain a hollow fiber membrane bearing a layer of three-dimensional network structure on the layer of spherical structure.

The obtained hollow fiber membrane had an outer diameter of 1340 μm, an inner diameter of 780 μm, an average diameter in the spherical structure of 3.0 μm, an average pore diameter of 0.04 μm on the surface of the layer of three-dimensional network structure, an average thickness of 34 μm in the layer of three-dimensional network structure, an average thickness of 246 μm in the layer of spherical structure, a pure water permeability of 0.6 m³/m²·hr, a latex particle blocking ability of 99%, a fracture strength of 8.2 MPa and a fracture elongation of 88%.

An electron photomicrograph (1,000×) of a cross section of the obtained hollow fiber membrane is shown in FIG. 1. Also an electron photomicrograph (60,000×) of a surface of the hollow fiber membrane (surface of the three-dimensional network structure layer) is shown in FIG. 2.

In an air scrubbing durability test, no fiber fracture was observed at all even after 122 days.

In an operation property evaluation, the filtration pressure difference was 30 kPa at the start of filtering operation and 34 kPa at the end of filtering operation, thus being lower at the start of filtering operation. An increase in the filtration pressure difference was as low as 13.3%, thus indicating that a stable operation was possible.

Thus, the obtained hollow fiber membrane was found to be excellent in the physical durability and in the operation property, thus being operable stably over a prolonged period. Results of evaluation are summarized in Table 1.

Example 2

A hollow fiber membrane of a spherical structure was prepared in the same manner as in Example 1.

Then a vinylidene fluoride homopolymer having a weight-average molecular weight of 284,000 by 14 wt %, cellulose acetate propionate (CAP482-0.5, manufactured by Eastman Chemical Co.) by 1 wt %, N-methyl-2-pyrrolidone by 77 wt %, T-20C by 5 wt % and water by 3 wt % were mixed and dissolved at 95° C. to obtain a polymer solution. This membrane forming liquid was uniformly coated on the surface of the hollow fiber membrane of spherical structure, and was immediately solidified in a water bath to obtain a hollow fiber membrane bearing a layer of three-dimensional network structure on the layer of spherical structure.

The obtained hollow fiber membrane had an outer diameter of 1340 µm, an inner diameter of 780 µm, an average diameter in the spherical structure of 2.4 µm, an average pore diameter of 0.05 µm on the surface of the layer of three-dimensional network structure, an average thickness of 30 µm in the layer of three-dimensional network structure, an average thickness of 251 µm in the layer of spherical structure, a pure water permeability of 1.0 $m^3/m^2 \cdot hr$, a blocking ability of 99%, a fracture strength of 8.5 MPa and a fracture elongation of 87%.

In an air scrubbing durability test, no fiber fracture was observed at all even after 122 days.

In an operation property evaluation, the filtration pressure difference was 28 kPa at the start of filtering operation and 30 kPa at the end of filtering operation, thus being lower at the start of filtering operation. An increase in the filtration pressure difference was as low as 7.1%, thus indicating that a stable operation was possible.

Thus, the obtained hollow fiber membrane was found to be excellent in the physical durability and in the operation property, thus being operable stably over a prolonged period. Results of evaluation are summarized in Table 1.

Example 3

A hollow fiber membrane of a spherical structure was prepared in the same manner as in Example 1.

Then a vinylidene fluoride homopolymer having a weight-average molecular weight of 284,000 by 14 wt %, cellulose acetate butyrate (CAB551-0.2, manufactured by Eastman Chemical Co.) by 1 wt %, N-methyl-2-pyrrolidone by 77 wt %, T-20C by 5 wt % and water by 3 wt % were mixed and dissolved at 95° C. to obtain a polymer solution. This membrane forming liquid was uniformly coated on the surface of the hollow fiber membrane of spherical structure, and was immediately solidified in a water bath to obtain a hollow fiber membrane bearing a layer of three-dimensional network structure on the layer of spherical structure.

The obtained hollow fiber membrane had an outer diameter of 1340 µm, an inner diameter of 780 µm, an average diameter in the spherical structure of 2.8 µm, an average pore diameter of 0.06 µm on the surface of the layer of three-dimensional network structure, an average thickness of 29 µm in the layer of three-dimensional network structure, an average thickness of 250 µm in the layer of spherical structure, a pure water permeability of 1.1 $m^3/m^2 \cdot hr$, a blocking ability of 99%, a fracture strength of 8.3 MPa and a fracture elongation of 82%.

In an air scrubbing durability test, no fiber fracture was observed at all even after 122 days.

In an operation property evaluation, the filtration pressure difference was 28 kPa at the start of filtering operation and 31 kPa at the end of filtering operation, thus being lower at the start of filtering operation. An increase in the filtration pressure difference was as low as 10.7%, thus indicating that a stable operation was possible.

Thus, the obtained hollow fiber membrane was found to be excellent in the physical durability and in the operation property, thus being operable stably over a prolonged period. Results of evaluation are summarized in Table 1.

Example 4

A hollow fiber membrane of a spherical structure was prepared in the same manner as in Example 1.

Then a vinylidene fluoride homopolymer having a weight-average molecular weight of 284,000 by 14 wt %, polyvinyl acetate having a polymerization degree of 500 (a 75% ethanol solution, manufactured by Nakarai Tesque Co.) by 1.25 wt %, N-methyl-2-pyrrolidone by 76.75 wt %, T-20C by 5 wt % and water by 3 wt % were mixed and dissolved at 95° C. to obtain a polymer solution. This membrane forming liquid was uniformly coated on the surface of the hollow fiber membrane of spherical structure, and was immediately solidified in a water bath to obtain a hollow fiber membrane bearing a layer of three-dimensional network structure on the layer of spherical structure.

The obtained hollow fiber membrane had an outer diameter of 1340 µm, an inner diameter of 780 µm, an average diameter in the spherical structure of 3.0 µm, an average pore diameter of 0.04 µm on the surface of the layer of three-dimensional network structure, an average thickness of 28 µm in the layer of three-dimensional network structure, an average thickness of 252 µm in the layer of spherical structure, a pure water permeability of 0.6 $m^3/m^2 \cdot hr$, a blocking ability of 99%, a fracture strength of 8.8 MPa and a fracture elongation of 85%.

In an air scrubbing durability test, no fiber fracture was observed at all even after 122 days.

In an operation property evaluation, the filtration pressure difference was 33 kPa at the start of filtering operation and 37 kPa at the end of filtering operation, thus being lower at the start of filtering operation. An increase in the filtration pressure difference was as low as 12.1%, thus indicating that a stable operation was possible.

Thus, the obtained hollow fiber membrane was found to be excellent in the physical durability and in the operation property, thus being operable stably over a prolonged period. Results of evaluation are summarized in Table 1.

Example 5

A hollow fiber membrane of a spherical structure was prepared in the same manner as in Example 1.

Then a vinylidene fluoride homopolymer having a weight-average molecular weight of 284,000 by 14 wt %, an ethylene-vinyl acetate copolymer (Polyace RDH, containing vinyl acetate by 68.5-71.5 mol %, manufactured by Taisei Kayaku Co.) by 1 wt %, N-methyl-2-pyrrolidone by 77 wt %, T-20C by 5 wt % and water by 3 wt % were mixed and dissolved at 95° C. to obtain a polymer solution. This membrane forming liquid was uniformly coated on the surface of the hollow fiber membrane of spherical structure, and was immediately solidified in a water bath to obtain a hollow fiber membrane bearing a layer of three-dimensional network structure on the layer of spherical structure.

The obtained hollow fiber membrane had an outer diameter of 1340 µm, an inner diameter of 780 µm, an average diameter in the spherical structure of 2.5 µm, an average pore diameter of 0.03 µm on the surface of the layer of three-dimensional network structure, an average thickness of 30 µm in the layer of three-dimensional network structure, an average thickness of 251 µm in the layer of spherical structure, a pure water permeability of 0.5 $m^3/m^2 \cdot hr$, a blocking ability of 99%, a fracture strength of 8.7 MPa and a fracture elongation of 85%.

In an air scrubbing durability test, no fiber fracture was observed at all even after 122 days.

In an operation property evaluation, the filtration pressure difference was 35 kPa at the start of filtering operation and 41 kPa at the end of filtering operation, thus being lower at the start of filtering operation. An increase in the filtration pressure difference was as low as 17.1%, thus indicating that a stable operation was possible.

Thus, the obtained hollow fiber membrane was found to be excellent in the physical durability and in the operation property, thus being operable stably over a prolonged period. Results of evaluation are summarized in Table 1.

Example 6

A hollow fiber membrane of a spherical structure was prepared in the same manner as in Example 1.

Then a vinylidene fluoride homopolymer having a weight-average molecular weight of 284,000 by 14 wt %, a vinylpyrrolidone-methyl methacrylate random copolymer having a weight-average molecular weight of 42,000 (copolymerizing ratio=55:45, hereinafter represented as PMMA-co-PVP) by 1 wt %, N-methyl-2-pyrrolidone by 77 wt %, T-20C by 5 wt % and water by 3 wt % were mixed and dissolved at 95° C. to obtain a polymer solution. This membrane forming liquid was uniformly coated on the surface of the hollow fiber membrane of spherical structure, and was immediately solidified in a water bath to obtain a hollow fiber membrane bearing a layer of three-dimensional network structure on the layer of spherical structure.

The obtained hollow fiber membrane had an outer diameter of 1340 µm, an inner diameter of 780 µm, an average diameter in the spherical structure of 2.5 µm, an average pore diameter of 0.03 µm on the surface of the layer of three-dimensional network structure, an average thickness of 33 µm in the layer of three-dimensional network structure, an average thickness of 246 µm in the layer of spherical structure, a pure water permeability of 0.4 $m^3/m^2 \cdot hr$, a blocking ability of 98%, a fracture strength of 8.3 MPa and a fracture elongation of 88%.

In an air scrubbing durability test, no fiber fracture was observed at all even after 122 days.

In an operation property evaluation, the filtration pressure difference was 38 kPa at the start of filtering operation and 46 kPa at the end of filtering operation, thus being lower at the start of filtering operation. An increase in the filtration pressure difference was as low as 21.1%, thus indicating that a stable operation was possible.

Thus, the obtained hollow fiber membrane was found to be excellent in the physical durability and in the operation property, thus being operable stably over a prolonged period. Results of evaluation are summarized in Table 1.

Example 7

A hollow fiber membrane of a spherical structure was prepared in the same manner as in Example 1.

Then a polymer solution, prepared in the same manner as in Example 1 except that T-20C was not added and the amount of N-methyl-2-pyrrolidone was changed to 82 wt %, was used in the same manner as in Example 1 to obtain a hollow fiber membrane bearing a layer of three-dimensional network structure on the layer of spherical structure.

The obtained hollow fiber membrane had an outer diameter of 1340 µm, an inner diameter of 780 µm, an average diameter in the spherical structure of 2.5 µm, an average pore diameter of 0.02 µm on the surface of the layer of three-dimensional network structure, an average thickness of 25 µm in the layer of three-dimensional network structure, an average thickness of 255 µm in the layer of spherical structure, a pure water permeability of 0.1 $m^3/m^2 \cdot hr$, a blocking ability of 99%, a fracture strength of 8.4 MPa and a fracture elongation of 85%, thus showing a lower permeability than in Example 1.

In an air scrubbing durability test, no fiber fracture was observed at all even after 122 days.

In an operation property evaluation, the filtration pressure difference was 48 kPa at the start of filtering operation and 60 kPa at the end of filtering operation, thus showing a somewhat higher filtration pressure difference, at the start of filtering operation, than in Example 1 because of the lower permeability. However, an increase in the filtration pressure difference was as low as 25.0%, thus indicating that a stable operation was possible.

Thus, the obtained hollow fiber membrane, though having a somewhat higher filtration pressure difference at the start of filtering operation, was found to be excellent in the physical durability and in the operation property, thus being operable stably over a prolonged period. Results of evaluation are summarized in Table 2.

Example 8

A hollow fiber membrane of a spherical structure was prepared in the same manner as in Example 1.

Then a polymer solution, prepared in the same manner as in Example 1, was used in the same manner as in Example 1 to obtain a hollow fiber membrane bearing a layer of three-dimensional network structure on the layer of spherical structure. However, the polymer solution was coated in a larger amount so as to obtain a layer of three-dimensional network structure thicker than in Example 1.

The obtained hollow fiber membrane had an outer diameter of 1400 µm, an inner diameter of 780 µm, an average diameter in the spherical structure of 2.5 µm, an average pore diameter of 0.02 µm on the surface of the layer of three-dimensional network structure, an average thickness of 60 µm in the layer of three-dimensional network structure, an average thickness of 250 µm in the layer of spherical structure, a pure water permeability of 0.2 $m^3/m^2 \cdot hr$, a blocking ability of 99%, a fracture strength of 8.3 MPa and a fracture elongation of 87%, thus showing a larger average thickness of the layer of three-dimensional network structure than in Example 1.

In an air scrubbing durability test, no fiber fracture was observed at all even after 122 days.

In an operation property evaluation, the filtration pressure difference was 55 kPa at the start of filtering operation and 67 kPa at the end of filtering operation, thus showing a somewhat higher filtration pressure difference at the start of the filtering operation, than in Example 1 because of the larger average thickness of the layer of three-dimensional network structure. However, an increase in the filtration pressure difference was as low as 21.8%, thus indicating that a stable operation was possible.

Thus, the obtained hollow fiber membrane, though having a somewhat higher filtration pressure difference at the start of filtering operation, was found to be excellent in the physical durability and in the operation property, thus being operable stably over a prolonged period. Results of evaluation are summarized in Table 2.

Example 9

A hollow fiber membrane of a spherical structure was prepared in the same manner as in Example 1.

Also polyethylene glycol methyl ether methacrylate (manufactured by Aldrich Inc., number-average molecular weight: 475) and methyl methacrylate were random copolymerized in an ordinary method to obtain a random copolymer of a copolymerizing molar ratio of 55:45 and a weight-average molecular weight of 45,000 (hereinafter represented as PMMA-co-PEGMA). More specifically, polyethylene glycol methyl ether methacrylate by 12 wt %, methyl methacrylate by 18 wt %, ethyl acetate by 69.9 wt % as a solvent, and 2,2'-azobis(isobutyronitrile) by 0.1 wt % as a polymerization initiator were polymerized under conditions of a polymerization temperature of 60° C. and a polymerization time of 4 hours.

Then a vinylidene fluoride homopolymer having a weight-average molecular weight of 284,000 by 14 wt %, PMMA-co-PEGMA by 1 wt %, N-methyl-2-pyrrolidone by 77 wt %, T-20C by 5 wt % and water by 3 wt % were mixed and dissolved at 95° C. to obtain a polymer solution. This membrane forming liquid was uniformly coated on the surface of the hollow fiber membrane of spherical structure, and was immediately solidified in a water bath to obtain a hollow fiber membrane bearing a layer of three-dimensional network structure on the layer of spherical structure.

The obtained hollow fiber membrane had an outer diameter of 1400 μm, an inner diameter of 780 μm, an average diameter in the spherical structure of 2.5 μm, an average pore diameter of 0.05 μm on the surface of the layer of three-dimensional network structure, an average thickness of 31 μm in the layer of three-dimensional network structure, an average thickness of 252 μm in the layer of spherical structure, a pure water permeability of 0.7 $m^3/m^2 \cdot hr$, a blocking ability of 99%, a fracture strength of 8.4 MPa and a fracture elongation of 87%.

In an air scrubbing durability test, no fiber fracture was observed at all even after 122 days.

In an operation property evaluation, the filtration pressure difference was 30 kPa at the start of filtering operation and 34 kPa at the end of filtering operation, thus being lower at the start of filtering operation. An increase in the filtration pressure difference was as low as 13.3%, thus indicating that a stable operation was possible.

Thus, the obtained hollow fiber membrane was found to be excellent in the physical durability and in the operation property, thus being operable stably over a prolonged period. Results of evaluation are summarized in Table 2.

Example 10

A hollow fiber membrane of a spherical structure was prepared in the same manner as in Example 1.

Also polypropylene glycol methyl ether acrylate (manufactured by Aldrich Inc., number-average molecular weight: 202) and methyl methacrylate were random copolymerized in an ordinary method to obtain a random copolymer of a copolymerizing molar ratio of 55:45 and a weight-average molecular weight of 38,000 (hereinafter represented as PMMA-co-PPGA). More specifically, polypropylene glycol methyl ether acrylate by 14 wt %, methyl methacrylate by 16 wt %, ethyl acetate by 69.9 wt % as a solvent, and 2,2'-azobis(isobutyronitrile) by 0.1 wt % as a polymerization initiator were polymerized under conditions of a polymerization temperature of 60° C. and a polymerization time of 5 hours.

Then a vinylidene fluoride homopolymer having a weight-average molecular weight of 284,000 by 14 wt %, PMMA-co-PPGA by 1 wt %, N-methyl-2-pyrrolidone by 77 wt %, T-20C by 5 wt % and water by 3 wt % were mixed and dissolved at 95° C. to obtain a polymer solution. This membrane forming liquid was uniformly coated on the surface of the hollow fiber membrane of spherical structure, and was immediately solidified in a water bath to obtain a hollow fiber membrane bearing a layer of three-dimensional network structure on the layer of spherical structure.

The obtained hollow fiber membrane had an outer diameter of 1400 μm, an inner diameter of 780 μm, an average diameter in the spherical structure of 2.5 μm, an average pore diameter of 0.06 μm on the surface of the layer of three-dimensional network structure, an average thickness of 33 μm in the layer of three-dimensional network structure, an average thickness of 251 μm in the layer of spherical structure, a pure water permeability of 0.6 $m^3/m^2 \cdot hr$, a blocking ability of 99%, a fracture strength of 8.3 MPa and a fracture elongation of 88%.

In an air scrubbing durability test, no fiber fracture was observed at all even after 122 days.

In an operation property evaluation, the filtration pressure difference was 33 kPa at the start of filtering operation and 38 kPa at the end of filtering operation, thus being lower at the start of filtering operation. An increase in the filtration pressure difference was as low as 15.1%, thus indicating that a stable operation was possible.

Thus, the obtained hollow fiber membrane was found to be excellent in the physical durability and in the operation property, thus being operable stably over a prolonged period. Results of evaluation are summarized in Table 2.

Example 11

A hollow fiber membrane of a spherical structure was prepared in the same manner as in Example 1.

Then a vinylidene fluoride homopolymer having a weight-average molecular weight of 284,000 by 14 wt %, cellulose acetate (same as in Example 1) by 3 wt %, N-methyl-2-pyrrolidone by 75 wt %, T-20C by 5 wt % and water by 3 wt % were mixed and dissolved at 95° C. to obtain a polymer solution. This membrane forming liquid was uniformly coated on the surface of the hollow fiber membrane of spherical structure, and was immediately solidified in a water bath to obtain a hollow fiber membrane bearing a layer of three-dimensional network structure on the layer of spherical structure.

The obtained hollow fiber membrane had an outer diameter of 1340 μm, an inner diameter of 780 μm, an average diameter in the spherical structure of 2.5 μm, an average pore diameter of 0.02 μm on the surface of the layer of three-dimensional network structure, an average thickness of 36 μm in the layer of three-dimensional network structure, an average thickness of 244 μm in the layer of spherical structure, a pure water permeability of 0.1 $m^3/m^2 \cdot hr$, a blocking ability of 99%, a fracture strength of 8.1 MPa and a fracture elongation of 75%.

In an air scrubbing durability test, no fiber fracture was observed at all even after 122 days.

In an operation property evaluation, the filtration pressure difference was 52 kPa at the start of filtering operation and 67 kPa at the end of filtering operation, thus showing a somewhat higher filtration pressure difference than in Example 1, because of the lower permeability. However, an increase in the filtration pressure difference was as low as 28.8%, thus indicating that a stable operation was possible.

Thus, the obtained hollow fiber membrane, though somewhat higher in the filtration pressure difference at the start of the filtering operation, was found to be excellent in the physical durability and in the operation property, thus being operable stably over a prolonged period. Results of evaluation are summarized in Table 2.

Comparative Example 1

A vinylidene fluoride homopolymer having a weight-average molecular weight of 284,000 by 25 wt %, cellulose acetate (same as in Example 1) by 2.5 wt %, N-methyl-2-pyrrolidone by 64.5 wt %, T-20C by 5 wt % and water by 3 wt % were mixed and dissolved at 95° C. to obtain a polymer solution. The obtained polymer solution was discharged from a die, accompanied by a 20 wt % aqueous solution of N-methyl-2-pyrrolidone as a hollow part forming liquid, and solidified in a water bath of 40° C. to obtain a hollow fiber membrane constituted solely of a three-dimensional network structure.

The obtained hollow fiber membrane had an outer diameter of 1340 µm, an inner diameter of 780 µm, an average pore diameter of 0.03 µm on the surface of the layer of three-dimensional network structure, an average thickness of 280 µm in the layer of three-dimensional network structure, a pure water permeability of 0.4 m³/m²·hr, a blocking ability of 98%, a fracture strength of 2.2 MPa and a fracture elongation of 28%. The obtained hollow fiber membrane had a low fracture strength and a low fracture elongation because of the absence of the layer of spherical structure.

In an air scrubbing durability test, a fiber fracture was observed after 12 days, and a fiber fracture was observed in the order of tens of fibers after 20 days.

As the fiber fractures were observed in the evaluation of air scrubbing durability, an operation over a prolonged period was judged difficult and the evaluation for operation property was not conducted. Results of evaluation are summarized in Table 3.

Comparative Example 2

A hollow fiber membrane of a spherical structure was prepared in the same manner as in Example 1.

Then a vinylidene fluoride homopolymer having a weight-average molecular weight of 284,000 by 15 wt %, N-methyl-2-pyrrolidone by 77 wt %, T-20C by 5 wt % and water by 3 wt % were mixed and dissolved at 95° C. to obtain a polymer solution. This membrane forming liquid was uniformly coated on the surface of the hollow fiber membrane of spherical structure, and was immediately solidified in a water bath to obtain a hollow fiber membrane bearing a layer of three-dimensional network structure on the layer of spherical structure.

The obtained hollow fiber membrane had an outer diameter of 1340 µm, an inner diameter of 780 µm, an average diameter in the spherical structure of 2.0 µm, an average pore diameter of 0.05 µm on the surface of the layer of three-dimensional network structure, an average thickness of 30 µm in the layer of three-dimensional network structure, an average thickness of 250 µm in the layer of spherical structure, a pure water permeability of 1.0 m³/m²·hr, a blocking ability of 98%, a fracture strength of 9.2 MPa and a fracture elongation of 80%.

In an air scrubbing durability test, no fiber fracture was observed at all even after 122 days.

In an operation property evaluation, the filtration pressure difference was 27 kPa at the start of filtering operation and 70 kPa at the end of filtering operation, thus being lower at the start of filtering operation. However an increase in the filtration pressure difference was as high as 160%, thus indicating that a stable operation was not possible.

Thus, the obtained hollow fiber membrane was found to be excellent in the physical durability but not stably operable because of the inferior operation property. Results of evaluation are summarized in Table 3.

Comparative Example 3

A hollow fiber membrane of a spherical structure was prepared in the same manner as in Example 1.

Then a vinylidene fluoride homopolymer having a weight-average molecular weight of 284,000 by 14 wt %, polymethyl methacrylate (Dianal BR-85, manufactured by Mitsubishi Rayon Co.) by 1 wt %, N-methyl-2-pyrrolidone by 77 wt %, T-20C by 5 wt % and water by 3 wt % were mixed and dissolved at 95° C. to obtain a polymer solution. This membrane forming liquid was uniformly coated on the surface of the hollow fiber membrane of spherical structure, and was immediately solidified in a water bath to obtain a hollow fiber membrane bearing a layer of three-dimensional network structure on the layer of spherical structure.

The obtained hollow fiber membrane had an outer diameter of 1340 µm, an inner diameter of 780 µm, an average diameter in the spherical structure of 2.5 µm, an average pore diameter of 0.04 µm on the surface of the layer of three-dimensional network structure, an average thickness of 23 µm in the layer of three-dimensional network structure, an average thickness of 257 µm in the layer of spherical structure, a pure water permeability of 0.8 m³/m²·hr, a blocking ability of 99%, a fracture strength of 8.7 MPa and a fracture elongation of 84%.

In an air scrubbing durability test, no fiber fracture was observed at all even after 122 days.

In an operation property evaluation, the filtration pressure difference was 36 Pa at the start of filtering operation and 60 kPa at the end of filtering operation, thus being lower at the start of filtering operation. However an increase in the filtration pressure difference was as high as 66.7%, thus indicating that a stable operation was not possible.

Thus, the obtained hollow fiber membrane was found to be excellent in the physical durability but not stably operable because of the inferior operation property. Results of evaluation are summarized in Table 3.

Comparative Example 4

A hollow fiber membrane of a spherical structure was prepared in the same manner as in Example 1, but with a somewhat larger outer diameter so as to obtain an average thickness of 280 µm. The hollow fiber membrane was evaluated without forming a layer of three-dimensional network structure on the layer of spherical structure.

The obtained hollow fiber membrane had an outer diameter of 1340 µm, an inner diameter of 780 µm, an average diameter in the spherical structure of 2.5 µm, an average thickness of 280 µm in the layer of spherical structure, a pure water permeability of 2.0 m³/m²·hr, a blocking ability of 97%, a fracture strength of 8.3 MPa and a fracture elongation of 84%.

In an air scrubbing durability test, no fiber fracture was observed at all even after 122 days.

In an operation property evaluation, the filtration pressure difference was 15 kPa at the start of filtering operation and 148 kPa at the end of filtering operation, thus being lower at the start of filtering operation. However an increase in the filtration pressure difference was as high as 887%, thus indicating that a stable operation was not possible.

Thus, the obtained hollow fiber membrane was found to be excellent in the physical durability but not stably operable because of the inferior operation property. Results of evaluation are summarized in Table 3.

TABLE 1

| | | Example 1 | Example 2 | Example 3 | Example 4 | Example 5 | Example 6 |
|---|---|---|---|---|---|---|---|
| layer of spherical structure | constituent polymer | vinylidene fluoride polymer | vinylidene fluoride polymer | vinylidene fluoride polymer | vinylidene fluoride polymer | vinylidene fluoride polymer | vinylidene fluoride polymer |
| | average diameter of approximately spherical parts (μm) | 3.0 | 2.4 | 2.8 | 3.0 | 2.5 | 2.5 |
| | average layer thickness (μm) | 246 | 251 | 250 | 252 | 251 | 246 |
| layer of three-dimensional network structure | constituent polymer composition — fluorinated resin-type polymer | vinylidene fluoride polymer | vinylidene fluoride polymer | vinylidene fluoride polymer | vinylidene fluoride polymer | vinylidene fluoride polymer | vinylidene fluoride polymer |
| | hydrophilic polymer | cellulose acetate | cellulose acetate propionate | cellulose acetate butyrate | polyvinyl acetate | ethylene-vinyl acetate copolymer | PMMA-co-PVP |
| | content ratio (%) of hydrophilic polymer to fluorinated resin-type polymer | 7 | 7 | 7 | 7 | 7 | 7 |
| | average pore size on surface (μm) | 0.04 | 0.05 | 0.06 | 0.04 | 0.03 | 0.03 |
| | average layer thickness (μm) | 34 | 30 | 29 | 28 | 30 | 33 |
| properties of separation membrane | pure water permeability (m³/m² · hr) | 0.6 | 1.0 | 1.1 | 0.6 | 0.5 | 0.4 |
| | latex particle blocking (%) | 99 | 99 | 99 | 99 | 99 | 98 |
| | fracture strength (MPa) | 8.2 | 8.5 | 8.3 | 8.8 | 8.7 | 8.3 |
| | fracture elongation (%) | 88 | 87 | 82 | 85 | 85 | 88 |
| | air scrubbing durability evaluation (fiber fracture in 122 days) | none | none | none | none | none | none |
| | filtration pressure difference at start of filtration (kPa) | 30 | 28 | 28 | 33 | 35 | 38 |
| | filtration pressure difference at end of filtration (kPa) | 34 | 30 | 31 | 37 | 41 | 46 |
| | increase in filtration pressure difference (%) | 13.3 | 7.1 | 10.7 | 12.1 | 17.1 | 21.1 |

TABLE 2

| | | Example 7 | Example 8 | Example 9 | Example 10 | Example 11 |
|---|---|---|---|---|---|---|
| layer of spherical structure | constituent polymer | Vinylidene fluoride polymer | vinylidene fluoride polymer | vinylidene fluoride polymer | vinylidene fluoride polymer | vinylidene fluoride polymer |
| | average diameter of approximately spherical parts (μm) | 2.5 | 2.5 | 2.5 | 2.5 | 2.5 |
| | average layer thickness (μm) | 255 | 250 | 252 | 251 | 244 |
| layer of three-dimensional network structure | constituent polymer composition — fluorinated resin-type polymer | Vinylidene fluoride polymer | vinylidene fluoride polymer | vinylidene fluoride polymer | vinylidene fluoride polymer | vinylidene fluoride polymer |
| | hydrophilic polymer | Cellulose acetate | cellulose acetate | PMMA-co-PEGMA | PMMA-co-PPGA | cellulose acetate |
| | content ratio (%) of hydrophilic polymer to fluorinated resin-type polymer | 7 | 7 | 7 | 7 | 21 |
| | average pore size on surface (μm) | 0.02 | 0.02 | 0.05 | 0.06 | 0.02 |
| | average layer thickness (μm) | 25 | 60 | 31 | 33 | 36 |
| properties of separation membrane | pure water permeability (m³/m² · hr) | 0.1 | 0.2 | 0.7 | 0.6 | 0.1 |
| | latex particle blocking (%) | 99 | 99 | 99 | 99 | 99 |
| | fracture strength (MPa) | 8.4 | 8.3 | 8.4 | 8.3 | 8.1 |
| | fracture elongation (%) | 85 | 87 | 87 | 88 | 75 |
| | air scrubbing durability evaluation (fiber fracture in 122 days) | none | none | none | none | none |
| | filtration pressure difference at start of filtration (kPa) | 48 | 55 | 30 | 33 | 52 |
| | filtration pressure difference at end of filtration (kPa) | 60 | 67 | 34 | 38 | 67 |
| | increase in filtration pressure difference (%) | 25.0 | 21.8 | 13.3 | 15.1 | 28.8 |

TABLE 3

|  |  | Comp. Ex. 1 | Comp. Ex. 2 | Comp. Ex. 3 | Comp. Ex. 4 |
|---|---|---|---|---|---|
| layer of spherical structure | constituent polymer | — | vinylidene fluoride polymer | vinylidene fluoride polymer | vinylidene fluoride polymer |
|  | average diameter of approximately spherical parts (μm) | — | 2.0 | 2.5 | 2.5 |
|  | average layer thickness (μm) | — | 250 | 257 | 280 |
| layer of three-dimensional network structure | constituent polymer composition — fluorinated resin-type polymer | vinylidene fluoride polymer | vinylidene fluoride polymer | vinylidene fluoride polymer | — |
|  | hydrophilic polymer | cellulose acetate | — | polymethyl methacrylate | — |
|  | content ratio (%) of hydrophilic polymer to fluorinated resin-type polymer | 10 | 0 | 0 | — |
|  | average pore size on surface (μm) | 0.03 | 0.05 | 0.04 | — |
|  | average layer thickness (μm) | 280 | 30 | 23 | — |
| properties of separation membrane | pure water permeability (m³/m² · hr) | 0.4 | 1.0 | 0.8 | 2.0 |
|  | latex particle blocking (%) | 98 | 98 | 99 | 97 |
|  | fracture strength (MPa) | 2.2 | 9.2 | 8.7 | 8.3 |
|  | fracture elongation (%) | 28 | 80 | 84 | 84 |
|  | air scrubbing durability evaluation (fiber fracture in 122 days) | present | none | none | none |
|  | filtration pressure difference at start of filtration (kPa) | — | 27 | 36 | 15 |
|  | filtration pressure difference at end of filtration (kPa) | — | 70 | 60 | 148 |
|  | increase in filtration pressure difference (%) | — | 160 | 66.7 | 887 |

Industrial Applicability

The polymer separation membrane of the present invention is applicable to a filtration separating membrane in the field of water treatment such as drinking water manufacture, water purifying treatment or waste water treatment, and in the fields of pharmaceutical manufacture, food-related industries, battery separators, charged membranes, fuel cells, and blood cleaning porous membranes.

The invention claimed is:

1. A polymer separation membrane which is a fluorinated resin-type polymer separation membrane comprising:
   a layer having a three-dimensional network structure; and
   a layer having a spherical structure,
   wherein a ratio (A/B) of an average thickness (A) of the layer having a three-dimensional network structure to an average thickness (B) of the layer having a spherical structure is from 0.07 to 0.25;
   wherein the layer having a three-dimensional network structure has a thickness of from 10 μm to 80 μm and comprises a fluorinated resin-type polymer composition containing a substantially water-insoluble hydrophilic polymer comprising:
   (a) a hydrophilic unit derived from at least one of vinylpyrrolidone, ethylene oxide and propylene oxide as a polymerization component, wherein in the water-insoluble hydrophilic polymer, the content of said hydrophilic unit is 50 mol % or less, and
   a molecular unit other than said hydrophilic unit; or
   (b) a hydrophilic unit derived from at least one of a cellulose ester and a fatty acid vinyl ester as a polymerization component;
   wherein the layer having a spherical structure does not substantially contain a hydrophilic polymer but contains a fluorinated resin-type polymer.

2. The polymer separation membrane according to claim 1, wherein, in the fluorinated resin-type polymer composition constituting the layer having a three-dimensional network structure, the substantially water-insoluble hydrophilic polymer comprises at least one of a cellulose ester and a fatty acid vinyl ester as a polymerization component.

3. The polymer separation membrane according to claim 1, wherein, in the fluorinated resin-type polymer composition constituting the layer having a three-dimensional network structure, the substantially water-insoluble hydrophilic polymer comprises at least one of cellulose acetate propionate, cellulose acetate butyrate and vinyl acetate as polymerization components.

4. The polymer separation membrane according to claim 1, which comprises the layer of three-dimensional network structure as an outermost layer.

5. The polymer separation membrane according to claim 1, wherein the layer having a spherical structure includes approximately spherical solid components having an average diameter of from 0.1 to 5 μm.

6. The polymer separation membrane according to claim 1, wherein the layer having a three-dimensional network structure has, on a surface thereof, pores of an average pore size of from 1 nm to 1 μm.

7. The polymer separation membrane according to claim 1, which is a hollow fiber separation membrane having: a pure water permeability at 50 kPa and 25° C. of from 0.20 to 10 m³/m²·hr; a fracture strength of 6 MPa or higher; and a fracture elongation of 50% or higher.

8. A membrane module utilizing the polymer separation membrane according to claim 1 as a filtration membrane.

9. The polymer separation membrane according to claim 1, wherein the molecular unit other than said hydrophilic unit is selected from the group consisting of ethylene, propylene, acetylene, vinyl halide, vinylidene halide, methyl methacrylate and methyl acrylate.

10. The polymer separation membrane according to claim 1, wherein, in the fluorinated resin-type polymer composition constituting the layer having a three-dimensional network structure, the content of the hydrophilic polymer is 2 wt % or more and less than 20 wt %, with respect to the amount of the fluorinated resin-type polymer.

* * * * *